(12) United States Patent
Ross et al.

(10) Patent No.: US 11,638,318 B2
(45) Date of Patent: *Apr. 25, 2023

(54) SYSTEMS AND METHODS FOR IMPROVING WIRELESS MESH NETWORKS

(71) Applicant: L3VEL, LLC, Wilmington, DE (US)

(72) Inventors: Kevin Ross, Lehi, UT (US); Muhammad Ahsan Naim, South Jordan, UT (US)

(73) Assignee: L3VEL, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,393

(22) Filed: Feb. 1, 2021

(65) Prior Publication Data

US 2021/0160943 A1 May 27, 2021

Related U.S. Application Data

(63) Continuation of application No. 16/508,289, filed on Jul. 10, 2019, now Pat. No. 10,966,266.
(Continued)

(51) Int. Cl.
*H04B 7/0408* (2017.01)
*H04L 41/14* (2022.01)
(Continued)

(52) U.S. Cl.
CPC .......... *H04W 76/15* (2018.02); *H04B 7/0408* (2013.01); *H04L 41/145* (2013.01);
(Continued)

(58) Field of Classification Search
CPC ........ H04B 5/0006–06; H04B 7/02–17; H04B 14/002–08; H04B 17/0082–409;
(Continued)

(56) References Cited

U.S. PATENT DOCUMENTS 5,351,053 A * 9/1994 Wicks ...................... H01Q 3/22
7,006,794 B1 2/2006 Lockie et al.
(Continued)

FOREIGN PATENT DOCUMENTS

KR 10-2011-0067150 A 6/2011
KR 102020130103443 A1 9/2013
(Continued)

OTHER PUBLICATIONS

International Searching Authority International Search Report and Written Opinion dated Oct. 28, 2019, issued in connection with International Application No. PCT/US2019/041270, filed Jul. 10, 2019, 11 pages.
(Continued)

*Primary Examiner* — Timothy J Weidner
(74) *Attorney, Agent, or Firm* — Lee Sullivan Shea & Smith LLP

(57) ABSTRACT

Disclosed herein is a first wireless communication node comprising a first communication module that includes a first baseband unit configured to handle baseband processing for the first communication module, a first RF unit configured to define a frequency range of radio signals for the first communication module, and a first antenna unit configured to generate a first extremely-narrow beam that facilitates exchange of radio signals with at least one other wireless communication node. The first wireless communication node may also comprise a second communication module that includes a second baseband unit configured to handle baseband processing for the second communication module, a second RF unit configured to define a frequency range of radio signals for the second communication module, and a second antenna unit configured to generate a second extremely-narrow beam that facilitates exchange of radio signals with at least one other wireless communication node.

24 Claims, 26 Drawing Sheets

Related U.S. Application Data

(60) Provisional application No. 62/856,697, filed on Jun. 3, 2019, provisional application No. 62/833,485, filed on Apr. 12, 2019, provisional application No. 62/771,508, filed on Nov. 26, 2018, provisional application No. 62/753,885, filed on Oct. 31, 2018, provisional application No. 62/696,688, filed on Jul. 11, 2018.

(51) Int. Cl.
| | |
|---|---|
| *H04W 16/28* | (2009.01) |
| *H04W 72/04* | (2009.01) |
| *H04W 76/15* | (2018.01) |
| *H04W 84/04* | (2009.01) |
| *H04W 84/18* | (2009.01) |
| *H04W 88/10* | (2009.01) |
| *H04W 88/14* | (2009.01) |
| *H04W 92/02* | (2009.01) |
| *H04W 92/04* | (2009.01) |
| *H04W 92/20* | (2009.01) |
| *H04W 92/24* | (2009.01) |
| *H04W 72/044* | (2023.01) |

(52) U.S. Cl.
CPC ......... *H04W 16/28* (2013.01); *H04W 72/046* (2013.01); *H04W 84/04* (2013.01); *H04W 84/18* (2013.01); *H04W 88/10* (2013.01); *H04W 88/14* (2013.01); *H04W 92/02* (2013.01); *H04W 92/045* (2013.01); *H04W 92/20* (2013.01); *H04W 92/24* (2013.01)

(58) Field of Classification Search
CPC . H04L 25/02–4975; H04L 2025/0335–03815; H04L 27/0002–389; H04L 2027/0016–0097; H04L 41/14–147; H04W 4/80; H04W 8/30; H04W 16/28; H04W 24/02–10; H04W 28/02–26; H04W 36/0005–385; H04W 40/005–38; H04W 72/005–14; H04W 76/10–50; H04W 84/005–22; H04W 88/005–188; H04W 92/02–24

See application file for complete search history.

(56) References Cited

U.S. PATENT DOCUMENTS

| | | |
|---|---|---|
| 7,466,985 B1 | 12/2008 | Handforth et al. |
| 8,385,921 B1 | 2/2013 | Shousterman |
| 8,406,126 B1 | 3/2013 | Leiba et al. |
| 8,634,392 B2 | 1/2014 | Stephens et al. |
| 9,425,985 B1 | 8/2016 | Shousterman et al. |
| 9,474,100 B2 | 10/2016 | Lam |
| 9,538,331 B2 | 1/2017 | Ross et al. |
| 9,621,465 B2 | 4/2017 | Ross |
| 9,860,179 B2 | 1/2018 | Ross |
| 9,942,776 B2 | 4/2018 | Ross et al. |
| 9,973,939 B2 | 5/2018 | Ross |
| 10,027,508 B2 | 7/2018 | Leiba et al. |
| D856,962 S | 8/2019 | Hart et al. |
| 10,447,378 B1 | 10/2019 | Kim et al. |
| 10,530,851 B1 | 1/2020 | Hart |
| 10,530,882 B2 | 1/2020 | Ross |
| 10,658,759 B2 | 5/2020 | Laxminarayana et al. |
| 10,966,266 B2 * | 3/2021 | Ross ..................... H04W 16/28 |
| 11,044,617 B2 | 6/2021 | Ross et al. |
| 11,129,222 B2 * | 9/2021 | Ross ..................... H04W 16/28 |
| 2002/0042274 A1 | 4/2002 | Ades |
| 2004/0001442 A1 | 1/2004 | Rayment et al. |
| 2004/0174900 A1 | 9/2004 | Volpi et al. |
| 2007/0165693 A1 * | 7/2007 | Samuel Mo ........ H04L 27/0004 |
| 2008/0125177 A1 | 5/2008 | Gupta |
| 2008/0297415 A1 * | 12/2008 | Berens .................. H04L 5/0058 |
| 2011/0150040 A1 * | 6/2011 | Kyeong ................... H01Q 3/02 |
| 2014/0057570 A1 | 2/2014 | Leiba |
| 2014/0204846 A1 | 7/2014 | Maltsev et al. |
| 2014/0370925 A1 | 12/2014 | Leiba |
| 2015/0358082 A1 | 12/2015 | Ross |
| 2016/0037396 A1 | 2/2016 | Lee et al. |
| 2016/0037431 A1 | 2/2016 | Kohli |
| 2016/0204913 A1 | 7/2016 | Agee et al. |
| 2016/0329631 A1 | 11/2016 | Rheinfelder et al. |
| 2017/0048775 A1 | 2/2017 | Kim |
| 2017/0135033 A1 | 5/2017 | Vecera et al. |
| 2017/0289976 A1 | 10/2017 | Lai et al. |
| 2018/0331935 A1 | 11/2018 | Ross et al. |
| 2018/0343685 A1 | 11/2018 | Hart et al. |
| 2020/0037381 A1 | 1/2020 | Ross et al. |
| 2020/0136718 A1 | 4/2020 | Fang |
| 2020/0358185 A1 * | 11/2020 | Tran ..................... H01Q 1/246 |
| 2021/0160943 A1 | 5/2021 | Ross et al. |

FOREIGN PATENT DOCUMENTS

| | | | |
|---|---|---|---|
| WO | WO-2005013410 A2 * | 2/2005 | ......... H04L 27/2601 |
| WO | 2018083548 A1 | 5/2018 | |

OTHER PUBLICATIONS

International Searching Authority International Search Report and Written Opinion dated Jan. 20, 2021, issued in connection with International Application No. PCT/US2020/053648, filed Sep. 30, 2020, 9 pages.

Sakaguchi et al. Where, When, and How mmWave is Used in 5G and Beyond [online] Invited Paper, 2017, 23 pages. Retrieved from the Internet: <URL:https://arxiv.org/pdf/1704.08131>.

White Paper: Solving the Wireless Mesh Multi-Hop Dilemma [online], Access/One Network, Strixsystems: Networks Without Wires, copyright 2005, 14 pages [retrieved on Nov. 30, 2016], Retrieved from the Internet: <URL: https//web.archive.org/web/20051124102628/https://www.strixssystems.com/products/datasheets/StrixWhitepaper_Multihop.pdf.

European Patent Office Partial Search Report dated Mar. 16, 2022, issued in connection with European Application No. 19833952.5, filed Feb. 2, 2021, 18 pages.

Chile Patent Office, Chile Examination Report and Translation dated Aug. 2, 2022, issued in connection with Chile Application No. 202100065, 21 pages.

Indian Patent Office, Examination Report dated Oct. 12, 2022, issued in connection with Indian Patent Application No. 202147005582, 7 pages.

European Patent Office Search Report dated Jun. 21, 2022, issued in connection with European Application No. 19833952.5, filed Feb. 2, 2021, 23 pages.

Chile Patent Office, Chile Examination Report and Translation dated Jan. 13, 2023, issued in connection with Chile Application No. 202100065, 38 pages.

* cited by examiner

SYSTEMS AND METHODS FOR IMPROVING WIRELESS MESH NETWORKS

CROSS-REFERENCE TO RELATED APPLICATIONS

This application is a continuation of, and claims priority to, U.S. Non-Provisional patent application Ser. No. 16/508,289, filed Jul. 10, 2019, and entitled "SYSTEM AND METHODS FOR IMPROVING WIRELESS MESH NETWORKS," which in turn claims priority to (i) U.S. Provisional App. No. 62/856,697, filed Jun. 3, 2019, and entitled "A METHOD FOR BUILDING WIRELESS MESH NETWORK NODES," (ii) U.S. Provisional App. No. 62/833,485, filed Apr. 12, 2019, and entitled "A METHOD FOR BUILDING WIRELESS MESH NETWORK NODES," (iii) U.S. Provisional App. No. 62/771,508, filed Nov. 26, 2018, and entitled "A METHOD FOR IMPROVING WIRELESS MESH NETWORK USING DIRECT OPTICAL-TO-RF AND DIRECT-RF-TO-OPTICAL CONVERSION MODULE," (iv) U.S. Provisional App. No. 62/753,885, filed Oct. 31, 2018, and entitled "METHODS OF BUILDING 60 GHZ MESH BASED NETWORK INFRASTRUCTURE FOR BLOCKCHAIN TECHNOLOGY BASED PLATFORMS," and (v) U.S. Provisional App. No. 62/696,688, filed Jul. 11, 2018, and entitled "METHODS FOR BUILDING WIRELESS MESH NETWORK," each of which is incorporated herein by reference in its entirety.

BACKGROUND

Wired and wireless networking and communications systems are widely deployed to provide various types of communication and functional features, including but not limited to those for high speed home internet, security and automation, and/or others. These systems may be capable of supporting communication with a user through a communication connection or a system management action.

Current wireless mesh networking systems exhibit many shortcomings, including failing to account for extra protection for point-to-point narrow beam wireless paths. Such paths are highly directional and work only under perfect line-of-sight or near line-of-sight conditions. Once the wireless mesh network is built, certain events such as vegetation growth or loss of an intermediary node can impact the line-of-sight paths between the links. This can result in single or multiple link failures in the network.

Thus, there exists multiple needs in the art for improved systems and methods relating to wireless communication mesh network design and operation.

Overview

The present disclosure, for example, relates to wireless networks and communications including, but not limited to, broadband internet services to end user, security and/or automation systems, and more particularly to narrow beam mesh networking and related operations and techniques.

In accordance with the present disclosure, disclosed herein are systems and methods that relate to narrow beam mesh networks, associated systems, and operations relating to network communication, including, in some embodiments, adjustments and modifications. The present systems and methods may facilitate designing, operating and/or adjusting/modifying wireless networking communications. In some embodiments, the present systems and methods relate to and account for wireless communication nodes with capability of establishing point-to-point or point-to-multi-point narrow beam communication link, point-to-point/point-to-multipoint steerable narrow beam communication link, combination of point-to-point and point-to-multipoint communication links, among other things.

In some instances, one or multiple links in a wireless communication network can fail due to certain events, including but not limited to growth in vegetation, loss of a node due to various reasons that can change the line-of-sight (LOS) conditions required for communication between two points in the wireless mesh network. In the present disclosure, some or all the nodes in the mesh network can host a 4G (LTE, LTE Advanced, LTE Pro, WiMAX, WiFi, etc.) technology-based small cell (eNB) and an UE (user equipment)/CPE (customer premises equipment) in a single enclosure to provide a redundant communication path between two points in a mesh network in an event a direct or in-direct LOS path between two mesh nodes fail.

The foregoing has outlined rather broadly the features and technical advantages of examples according to this disclosure so that the following detailed description may be better understood. Additional features and advantages will be described below. It should be understood that the specific examples disclosed herein may be readily utilized as a basis for modifying or designing other structures for carrying out the same operations disclosed herein. Characteristics of the concepts disclosed herein including their organization and method of operation together with associated advantages will be better understood from the following description when considered in connection with the accompanying figures. It should be understood that the figures are provided for the purpose of illustration and description only.

Accordingly, in one aspect, disclosed herein is (1) a first communication module that includes a first baseband unit configured to handle baseband processing for the first communication module, a first RF unit configured to define a frequency range of radio signals for the first communication module, and a first antenna unit configured to generate a first extremely-narrow beam that facilitates exchange of radio signals with at least one other wireless communication node, and (2) a second communication module that includes a second baseband unit configured to handle baseband processing for the second communication module, a second RF unit configured to define a frequency range of radio signals for the second communication module, and a second antenna unit configured to generate a second extremely-narrow beam that facilitates exchange of radio signals with at least one other wireless communication node.

In another aspect, disclosed herein is a first wireless communication node comprising (1) a first communication module that includes a first baseband unit configured to handle baseband processing for the first communication module, a first RF unit configured to define a frequency range of radio signals for the first communication module, and an antenna unit configured to generate an extremely-narrow beam that facilitates exchange of radio signals with at least one other wireless communication node, and (2) a second communication module that includes a second baseband unit configured to handle baseband processing for the second communication module, a second RF unit configured to define a frequency range of radio signals for the second communication module, and an active antenna system (AAS) that comprises a phased array of transmitters and receivers configured to generate a plurality of beams in different directions that facilitate exchange of radio signals with at least one other wireless communication node, wherein the plurality of beams are not extremely narrow.

In yet another aspect, disclosed herein is a communication system comprising a first wireless communication node comprising at least first and second communication modules, a second wireless communication node comprising at least a third communication module, and a third wireless communication node comprising at least a fourth communication module. The first communication module of the first wireless communication node includes a first baseband unit configured to handle baseband processing for the first communication module, a first RF unit configured to define a frequency range of radio signals for the first communication module, and a first antenna unit configured to generate a first extremely-narrow beam that facilitates exchange of radio signals with at least the second wireless communication node. The second communication module of the first wireless communication node includes a second baseband unit configured to handle baseband processing for the second communication module, a second RF unit configured to define a frequency range of radio signals for the second communication module, and a given one of (a) a second antenna unit configured to generate a second extremely-narrow beam that facilitates exchange of radio signals with at least the third wireless communication node or (b) a first active antenna system (AAS) that comprises a phased array of transmitters and receivers configured to generate a plurality of beams in different directions that facilitate exchange of radio signals with at least the third wireless communication node. The third communication module of the second wireless communication node includes a third baseband unit configured to handle baseband processing for the third communication module, a third RF unit configured to define a frequency range of radio signals for the third communication module, and a third antenna unit configured to generate a third extremely-narrow beam that facilitates exchange of radio signals with at least the first wireless communication node. The fourth communication module of the third wireless communication node includes a fourth baseband unit configured to handle baseband processing for the fourth communication module, a fourth RF unit configured to define a frequency range of radio signals for the fourth communication module, and a given one of (a) a fourth antenna unit configured to generate a fourth extremely-narrow beam that facilitates exchange of radio signals with at least the first wireless communication node or (b) a second AAS that comprises a phased array of transmitters and receivers configured to generate a plurality of beams in different directions that facilitate exchange of radio signals with at least the first wireless communication node.

One of ordinary skill in the art will appreciate these as well as numerous other aspects in reading the following disclosure.

BRIEF DESCRIPTION OF THE DRAWINGS

A further understanding of the nature and advantages the present disclosure may be realized by reference to the following drawings.

DETAILED DESCRIPTION

Current wireless mesh networking systems exhibit many shortcomings, including failing to account for extra protection for a high reliability wireless path for carrying backhaul data that carries control signaling data along with user data for users in the network segment. Current wireless mesh networking systems use the same or similar beam transmission techniques for an access path that carries data for a single user and backhaul path that may affect network performance as backhaul paths tend to be more sensitive to interference and other signal inhibitors and can degrade the performance of entire network segment. Thus, there exists multiple needs in the art for improved systems and methods relating to wireless communication network design and operation.

Figure 1:
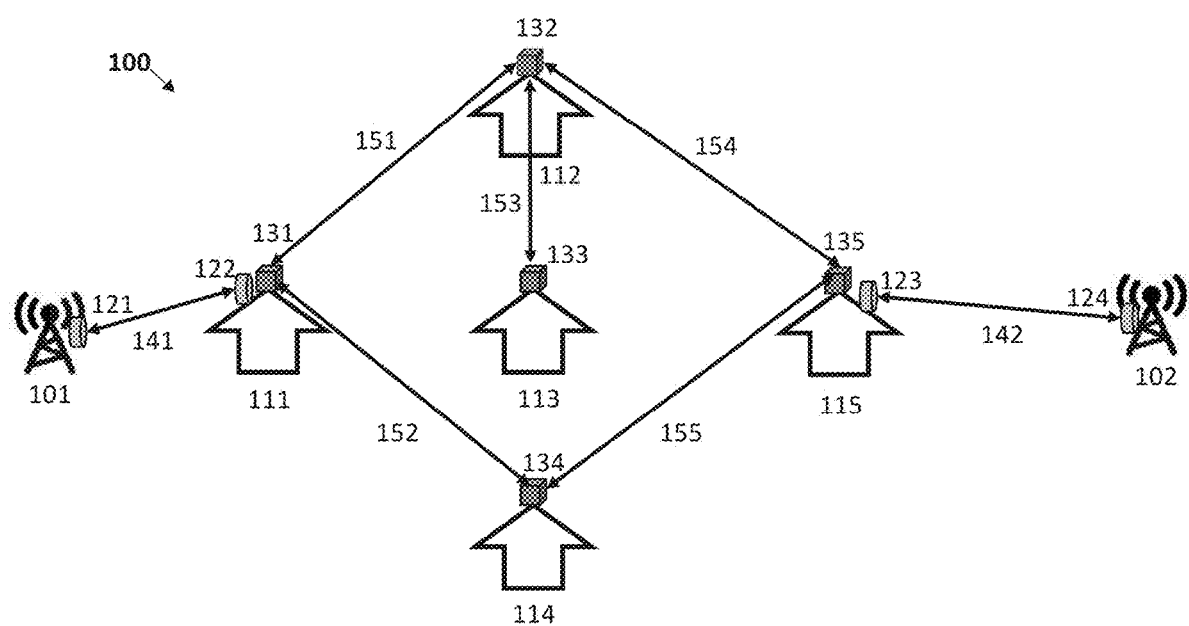
FIG. 1 depicts an example diagram relating to a wireless networking and communication system, in accordance with various aspects of this disclosure.

Referring to FIG. 1, a data communication network capable of providing multigigabit internet speeds through wireless point-to-point and point-to-multipoint links is illustrated. Communication network 100 in FIG. 1 includes Tower/fiber access points 101 and 102. Tower/fiber access points 101 and 102 can be co-located or can be located at different physical locations. Tower/fiber access points 101 and 102 have access to a high bandwidth dark fiber capable of providing up to several hundred gigabits/second of data throughput. Tower/fiber access points 101 and 102 provide backhaul connectivity between a core network/data center (not shown in the FIG. 1 for the sake of simplicity) and a seed home of the communication network described below. Tower/Fiber access points 101 and 102 also host wireless point-to-point communication nodes 121 and 124.

As shown, wireless communication nodes 121 and 124 are capable of reception and transmission of high bandwidth (multiple gigahertz) signals operating at very high frequency (6 Ghz~100 Ghz such as 28 Ghz, V band, E band, etc.). Wireless communication nodes 121 and 124 each comprise a baseband/digital unit equipped with components including but not limited to a processor, memory, etc. Wireless communication nodes 121 and 124 also each comprise an RF unit and antenna unit. The antenna subsystem of wireless communication nodes 121 and 124 is capable of reception and transmission of directional signals where significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees.

As further shown in FIG. 1, Communication network 100 includes seed homes 111 and 115. Examples of seed homes include detached single-family homes, multi-dwelling units (MDUs), small/medium business (SMB), etc., where communication equipment nodes can be deployed on rooftops. Seed homes 111 and 115 host wireless point-to-point communication nodes 122 and 123. Wireless communication nodes 122 and 123 are capable of reception and transmission of high bandwidth (multiple gigahertz) signals operating at very high frequency (6 Ghz~100 Ghz such as 28 Ghz, V band, E band, etc.).

Wireless communication nodes 122 and 123 comprise a baseband/digital unit equipped with components including but not limited to a processor, memory, etc. Wireless communication nodes 122 and 123 also comprise an RF unit and antenna unit. The antenna subsystem of wireless communication nodes 122 and 123 is capable of reception and transmission of directional signals where a significant portion of the signal energy is concentrated within few degrees around the antenna boresight (e.g., within a range of 0.5 degrees to 5 degrees), both in vertical and horizontal directions, in contrast to omni directional antennas where signal energy is close to evenly spread across 360° degrees.

Wireless communication node 121 residing in Tower/fiber access point location 101 and wireless communication node 122 residing in seed home 111 work together to form a bi-directional high bandwidth communication point-to-point data link 141 that provides connectivity between Tower/fiber access point 101 and seed home 111 segment of communication network 100. Similarly, wireless communication node 124 residing in Tower/fiber access point location 102 and wireless communication node 123 residing in seed home 115 work together to form a bi-directional high bandwidth communication point-to-point data link 142 that provides connectivity between Tower/fiber access point 102 and seed home 115 segment of the communication network 100.

Seed home 111, in addition to wireless communication node 122, hosts a second wireless communication node 131. Second wireless communication node 131 comprises multiple independent transmission/reception modules. Each module of the wireless communication node 131 is capable of reception and transmission of high bandwidth (multiple gigahertz) signals operating at very high frequency (6 Ghz~100 Ghz such as 28 Ghz, V band, E band, etc.). Each module of wireless communication node 131 comprises an independent baseband/digital unit equipped with components including but not limited to a processor, memory, etc. Each module in wireless communication node 131 also comprises an independent RF unit and independent antenna unit. The antenna subsystem of each wireless communication node 131's module is capable of reception and transmission of directional signals where significant portion of the signal energy is concentrated within few degrees around the antenna boresight (e.g., within a range of 0.5 degrees to 5 degrees), both in vertical and horizontal directions, in contrast to omni directional antennas where signal energy is close to evenly spread across 360° degrees.

Communication network 100 also includes multiple anchor homes 112, 113 and 114. Each of these anchor homes host a wireless communication node similar to wireless communication node 131 described above. However, unlike seed homes, a wireless communication node on an anchor home only provides wireless connectivity to one or more anchor homes and/or seed homes but does not provide connectivity to the Tower/Fiber access point. For example, anchor home 112 hosts wireless communication node 132. A first module of wireless communication node 132 residing in anchor home 112 and another module of wireless communication node 131 residing in seed home 111 work together to form a bi-directional high bandwidth communication point-to-point data link 151 that provides connectivity between seed home 111 and anchor home 112 segment of the communication network 100. Similarly, as another example, a second module of wireless communication node 132 residing in anchor home 112 and a module of wireless communication node 133 residing in anchor home 113 work together to form a bi-directional high bandwidth communication point-to-point data link 153 that provides connectivity between anchor home 112 and anchor home 113. As yet another example, a third module of wireless communication node 132 residing in anchor home 112 and a module of wireless communication node 135 residing in seed home 115 work together to form a bi-directional high bandwidth communication point-to-point data link 154 that provides connectivity between anchor home 112 and seed home 115. As a further example, another module of wireless communication node 131 residing in seed home 111 and a module of wireless communication node 134 residing in anchor home 114 work together to form a bi-directional high bandwidth communication point-to-point data link 152 that provides connectivity between anchor home 114 and seed home 111. As another example, another module of wireless communication node 134 residing in anchor home 114 and a module of wireless communication node 135 residing in seed home 115 work together to form a bi-directional high bandwidth communication point-to-point data link 156 that provides connectivity between anchor home 114 and seed home 115. Other examples are possible as well.

Bi-directional communication links 141, 142, 151, 152, 153, 154 & 155 shown in FIG. 1 can use various different multiple access schemes for transmission and reception including but not limited to frequency division multiple access (FDMA), time division multiple access (TDMA), single carrier FDMA (SC-FDMA), single carrier TDMA (SC-TDMA), code division multiple access (CDMA), orthogonal frequency division multiple access (OFDMA), and/or non-orthogonal multiple access (NOMA) as described in various generations of communication technologies including 1G, 2G, 3G, 4G, 5G and 6G, etc. Bi-directional communication links 141, 142, 151, 152, 153, 154 & 155 formed by a set of communication nodes comprising two or more of 121, 122, 123, 124, 131, 132, 133, 134, and/or 135 are capable of data information transfer via a variety of digital transmission schemes, including but not limited to amplitude modulation (AM), phase modulation (PM), pulse amplitude modulation/quadrature amplitude modulation (PAM/QAM), and/or ultra-wide band (UWB) pulse modulation (pico-second pulses), etc.

In FIG. 1, two Tower/fiber access points 101 & 102, two seed homes 111 & 115 and three anchor homes 112, 113 & 114 and seven bi-directional point to point data links 141, 142, 151, 152, 153, 154 & 155 are shown to illustrate an example of a communication network. However, in general, it should be understood that communication network 100 can include a different number of Tower/fiber nodes, seed homes, anchor homes and/or communication links, which may depend on the specific layout of a particular instantiation of the communication network deployed in the field. Similarly, although, FIG. 1 shows four communication nodes 121, 122, 123 & 124 that provide connectivity between a Tower/fiber access point (e.g., Tower/fiber access points 101, 102) and a seed home, five communication nodes 131, 132, 133, 134 & 135 that provide connectivity between two anchor homes or between an anchor and a seed home, the number of these communication nodes can vary from one communication network to another communication network, which may depend on the specific size and layout of a particular instantiation of the communication network. It should also be understood that communication network 100 may also contain other nodes (e.g., network switches/routers, etc.) that are omitted here for the sake of simplicity.

Figure 2:
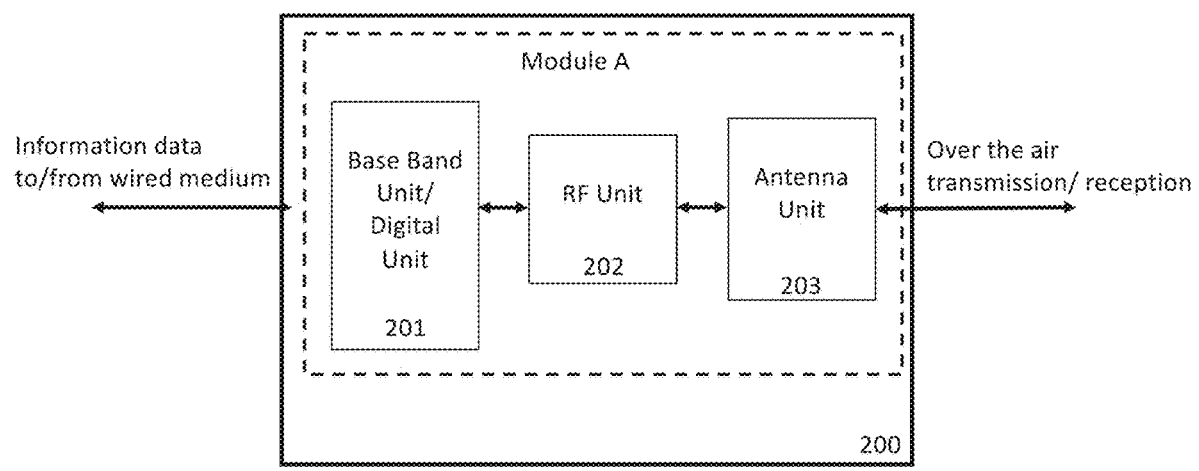
FIG. 2 depicts an example wireless communication node comprising a module, in accordance with various aspects of this disclosure.

Referring to FIG. 2, one possible embodiment of wireless communication node 131 of FIG. 1 is shown as wireless communication node 200. Wireless communication node 200 in FIG. 2 comprises a module labelled as "Module A." As shown, Module A comprises a base band unit or digital unit 201 which runs the physical layer level protocol including digital modulation/demodulation (modem) and other higher layer protocols such as MAC layer etc. Base band unit 201 interacts with other nodes of communication network that are external to the wireless communication node 200 via a wired medium.

Module A also includes RF unit 202 which, among other things, performs processing of intermediate frequency (IF) signals and defines the frequency range of the radio signals that can be transmitted or received via Module A. RF unit 202 is capable of operating over a wide range of frequencies (e.g., V band frequencies ranging from 57 Ghz to 71 Ghz).

Further, as shown, Module A also comprises antenna unit 203 which performs the transmission and reception of over the air radio signals. Antenna unit 203 is capable of transmitting and receiving extremely narrow beam of signals. Antenna unit 203 may be constructed with metamaterials that have excellent properties of controlling the directionality of radio signals that cannot be exhibited by ordinary antennas. Module A with the help of antenna unit 203 is capable of establishing point-to-point links with a different module residing in a different wireless communication node.

Figure 3:
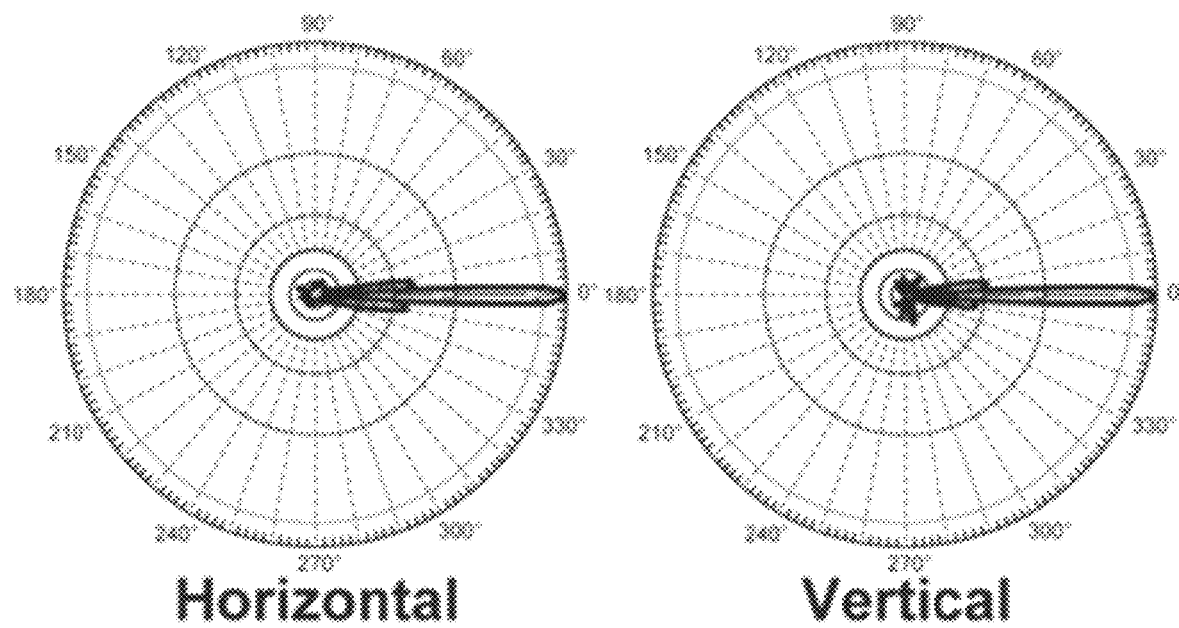
FIG. 3 depicts an example antenna pattern of a module, in accordance with various aspects of this disclosure.

Referring to FIG. 3, an example of an antenna pattern of Module A created by antenna unit 203 is shown. It can be seen from the antenna pattern in FIG. 3 that the beam width of antenna unit 203 of Module A is extremely narrow (less than a degree) and the side lobe power levels start to drop at a rapid rate. For instance, as shown, approximately 5-6 degrees from the main lobe, power levels may drop by more than 30 dB.

It should be understood that the antenna pattern of antenna unit 203 shown in FIG. 3 is just one example showing the extremely narrow beam antenna pattern generation capability of Module A. In other instances, due to change in antenna elements, size, frequency, etc., different patterns may be generated. Further, while Module A can be constructed using metamaterials described above, it should be understood that Module A can be constructed using a parabolic antenna or other types of antennas. However, it should be understood that the main characteristic of generation of extremely narrow antenna beam pattern is common to all the instances of Module A.

Figure 4:
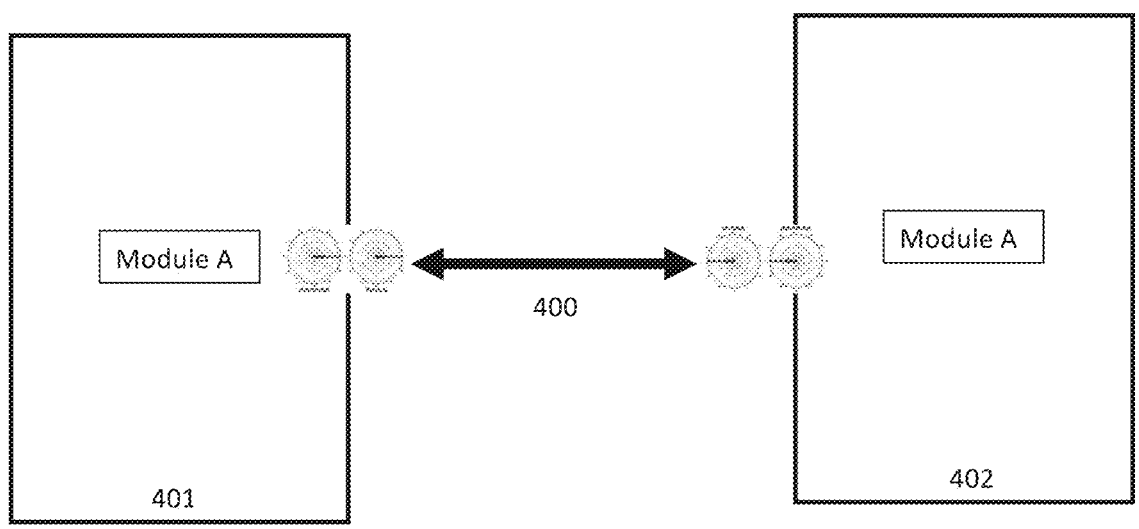
FIG. 4 depicts an example communication link between two wireless communication nodes, in accordance with various aspects of this disclosure.

Referring to FIG. 4, a point-to-point wireless communication link 400 established between two wireless communication nodes 401 and 402 is shown. Wireless communication nodes 401 and 402 each host a single communication module (i.e., "Module A") that may take the form similar to Module A depicted in FIG. 2 and described above. As shown in FIG. 4, due to the antenna unit characteristics of Module A in wireless communication node 401 and 402, the bi-directional point-to-point link 400 may have an extremely narrow beam. This transmission and reception capability of radio signals over an extremely narrow beam via point-to-point link 400 provides interference immunity in scenarios where there are a large number of wireless communication links established by multiple wireless communication nodes concentrated in a small area and operating in the same frequency.

In some implementations, Module A can additionally provide beam steerability characteristics in addition to the capability of transmitting and receiving data over extremely narrow beams as explained above and illustrated in the context of FIGS. 2-4.

Figure 5:
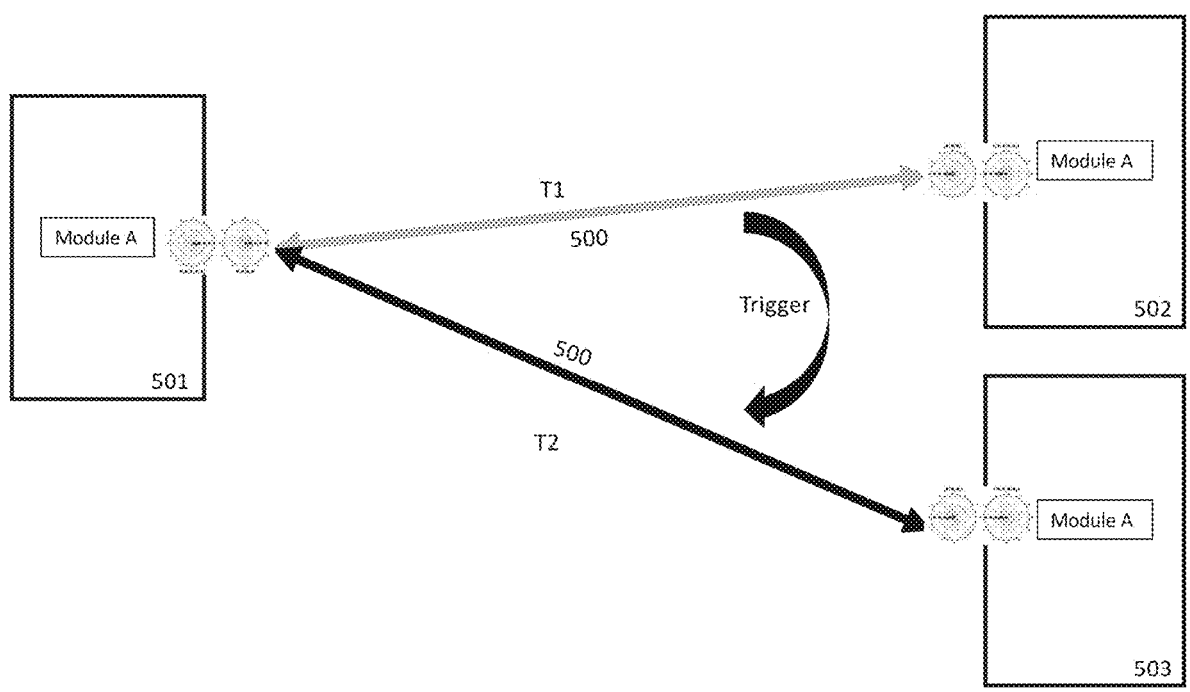
FIG. 5 depicts example wireless communication nodes, in accordance with various aspects of this disclosure.

For example, referring to FIG. 5, a wireless communication node 501 comprising Module A, a second wireless communication node 502 comprising Module A and a third wireless communication node 503 comprising Module A is shown. During time T1, Module A of wireless communication node 501 and Module A of wireless communication node 502 work together to establish an extremely narrow beam based bi-directional link 500 for the exchange of information data between wireless communication nodes 501 and 502. Due to some trigger, Module A of wireless communication node 501 may invoke the beam steering capability of the module and change the direction of the antenna transmission and reception beam towards wireless communication node 503 and work together with Module A of wireless communication node 503 to dynamically establish a bi-directional extremely narrow beam-based link 500 between wireless communication node 501 and wireless communication node 503 during time T2. The trigger for this beam steering can be due to changes in the link condition between wireless communication node 501 and wireless communication node 502 which may involve various factors, including but not limited to a change from a LOS path to a non-LOS path due to a change in environment, increased interference, a change in position of wireless communication node 502 with respect to wireless communication node 501, and/or instructions from higher layers, etc.

In one embodiment, wireless communication node 503 can be different than wireless communication node 502. In another embodiment, wireless communication node 503 can be the same as wireless communication node 502 but in a different physical location.

In some embodiments, wireless communication nodes defined above and discussed in the context of FIGS. 2-5 can host more than one module. This allows a wireless communication node to communicate simultaneously with multiple wireless communication nodes by establishing multiple extremely narrow beam bi-directional links with the help of multiple modules (e.g., multiple Module As) belonging to different wireless communication nodes working together.

Figure 6:
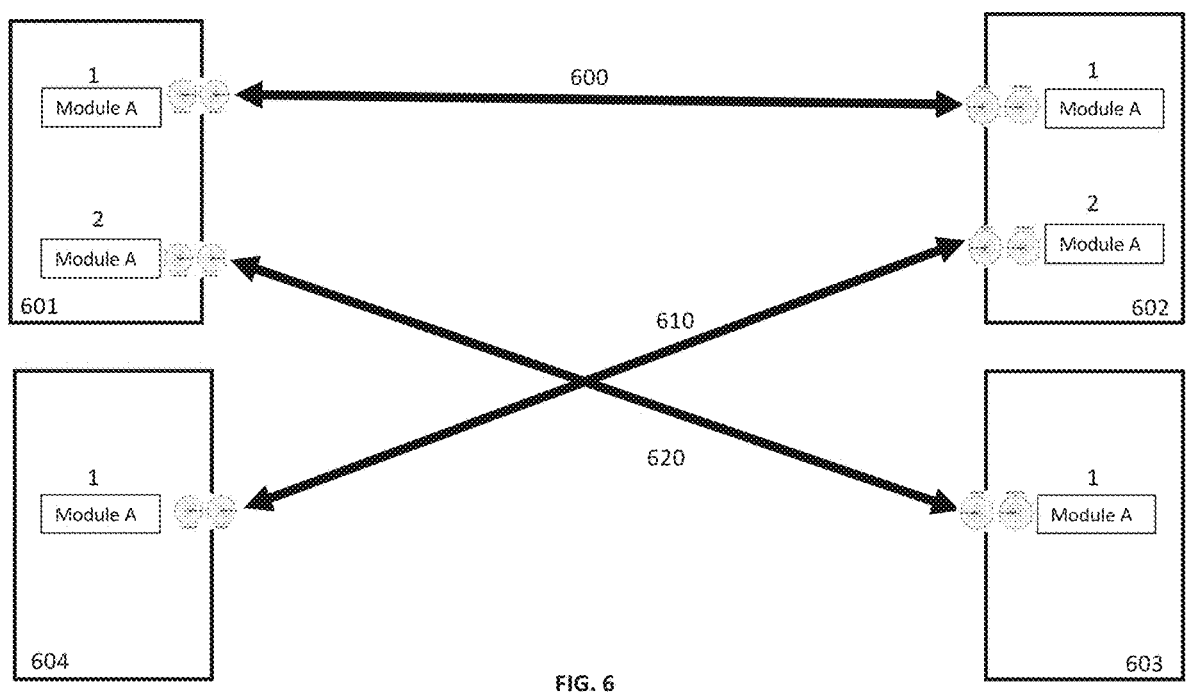
FIG. 6 depicts example wireless communication nodes that are communicatively coupled, in accordance with various aspects of this disclosure.

As one example to illustrate, referring to FIG. 6, wireless communication nodes 601 and 602 each host two Module As labeled "1" and "2," while wireless communication nodes 603 and 604 each host a single Module A. As shown, a $1^{st}$ Module A of wireless communication node 601 and a $1^{st}$ Module A of wireless communication node 602 work together to establish extremely narrow bi-directional beam-based link 600 to provide wireless connection between wireless communication node 601 and 602. Similarly, a 2nd Module A of wireless communication node 601 and 602 and a $1^{st}$ (and only) Module A of wireless communication node 603 and 604 respectively work together to establish extremely narrow bi-directional beam-based links 610 and 620 to provide wireless connection between wireless communication nodes 601-603 and 602-604 respectively.

In one embodiment, the $1^{st}$ and $2^{nd}$ Module A of wireless communication nodes 601 and 602 can be inside the same physical enclosure and in other embodiments, the $1^{st}$ Module A of wireless communication nodes 601 and 603 can be inside one physical enclosure and the $2^{nd}$ Module A of wireless communication nodes 601 and 603 can be inside a different physical enclosure. In embodiments where different Module As belonging to the same wireless communication node are contained in separate physical enclosures, these Module As can be connected via a wired link as they are co-located in the same seed home or anchor home.

In FIG. 6, a maximum of two Module As are shown to be contained in a wireless communication node that enables the wireless communication node to establish two independent bi-directional links with different wireless communication nodes simultaneously. However, it should be understood that a wireless communication node can host more than two Module As and the maximum number of Module As that a wireless communication node can host may depend on the maximum total power available to the wireless communication node.

Further, it should be understood that in one embodiment, all Module As belonging to the same wireless communication node may operate on the same carrier frequencies of a frequency band, and in other embodiments, different Module As belonging to same wireless communication node may operate on different carrier frequencies of a frequency band.

Figure 7:
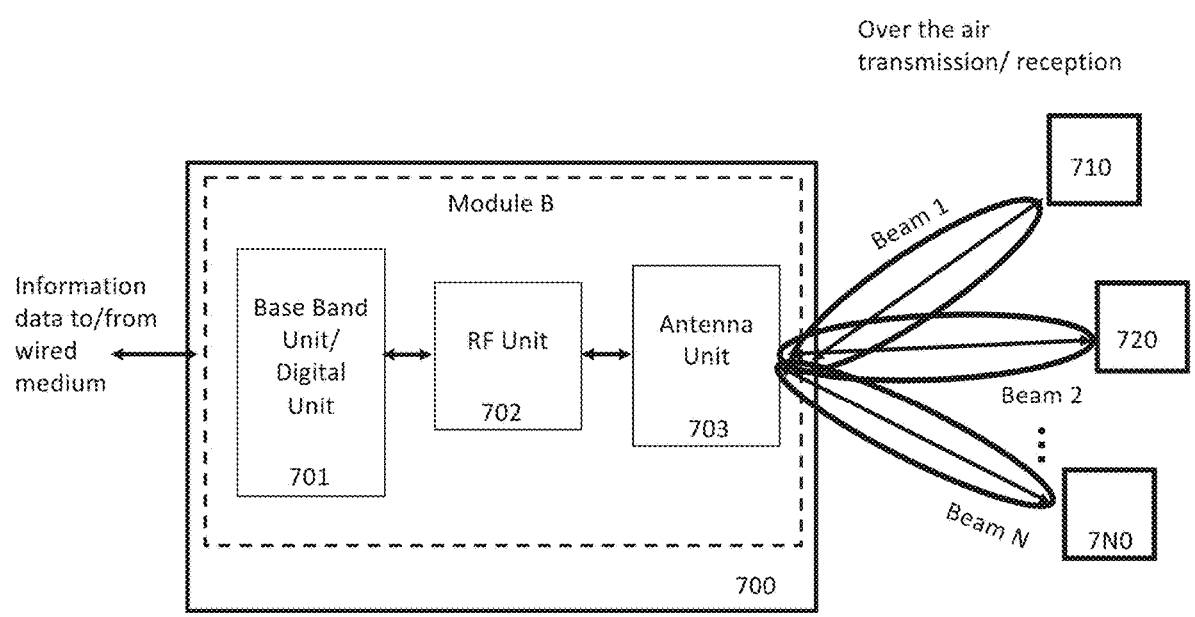
FIG. 7 depicts another example wireless communication node comprising a module, in accordance with various aspects of this disclosure.

Referring to FIG. 7, another embodiment of wireless communication node 131 of FIG. 1 is shown as wireless communication node 700. Wireless communication node 700 in FIG. 7 comprises a single module labeled as "Module B." Module B comprises base band unit or digital unit 701 which runs the physical layer level protocol including digital modulation/demodulation (modem) and other higher layer protocols such as MAC layer, etc. Base band unit 701 interacts with other nodes of the communication network that are external to the wireless communication node 700 via wired medium.

Module B also includes RF unit 702, which among other things processes intermediate frequency (IF) signals and defines the frequency range of the radio signals that can be transmitted or received with Module B. RF unit 702 is capable of operating over a wide range of frequencies (e.g., V band frequencies ranging from 57 Ghz to 71 Ghz).

Further, Module B comprises antenna unit 703, which performs the transmission and reception of over the air radio signals. Antenna unit 703 may be an active antenna system (AAS) that comprises a phased array of transmitters and receivers that are capable of beamforming and creating multiple beams simultaneously in different directions. By virtue of the simultaneous creation of multiple beams in different directions, AAS of antenna unit 703 enables the wireless communication node 700 to establish point-to-multipoint wireless communication links with multiple wireless communication nodes. Hence Module B with the help of antenna unit 703 is capable of establishing point-to-multipoint links with a different module residing in a different wireless communication node.

As further shown in FIG. 7, Module B residing in wireless communication node 700 is shown to create 1 to N multiple beams with the help of AAS of antenna unit 703. Value N depends on the number of transmit and receive antennas in AAS of antenna unit 703. Specifically, it can be seen that wireless communication unit 700 is connected to wireless communication unit 710, wireless communication unit 720, and wireless communication unit 7N0 via bi-directional beam 1, beam 2 and beam N respectively. It can also be seen from the antenna pattern in FIG. 7 that the beam width of point-to-multipoint beams of antenna unit 703 of Module B are not extremely narrow (e.g. 3 dB beam width of 7-10 degree) and side lobes power levels do not start to drop at a rapid rate which is in contrast to the antenna pattern of the antenna unit belonging to Module A described above and discussed in the context of FIGS. 2-6.

Further, Module B of wireless communication node 700 also differs from Module A (discussed above in the context of FIGS. 2-6) with respect to the limitation that the multiple bi-directional links operate in a single frequency range at a given time. For example, signal beams 1 to N that connect wireless communication node 700 to wireless communication nodes 710 to 7N0 respectively may only operate within the same frequency range at a given instant of time. It is to be noted that at a different instant, all beams 1 to N can switch to operate at a frequency range different from the frequency range used in the previous time instant, however, frequency range of an individual beam remains the same as the frequency range of all the other N−1 beams at a given instant of time. Hence, with respect to Module B, although due to phased antenna arrays can create multiple beams to create point-to-multi point links to connect one wireless communication node with multiple wireless communication nodes as shown in FIG. 7, an interference profile at the receiver side with such point-to-multipoint network is inferior to an interference profile of point-to-multipoint network where a wireless communication node hosts multiple Module As and creates multiple point-to-point links as shown in FIG. 6, where wireless communication node 601 uses two Module As to connect to wireless communication node 602 and wireless communication node 603 simultaneously. The main reasons of high interference with Module B may be due to (1) individual phased antenna array-based beams that are not as narrow as extremely narrow beams generated by metamaterial-based antenna of Module A and/or (2) all beams of Module B belonging to one wireless communication unit that cannot operate at different frequency ranges unlike multiple point-to-point narrow beams of wireless communication node that host multiple Module As.

Figure 8:
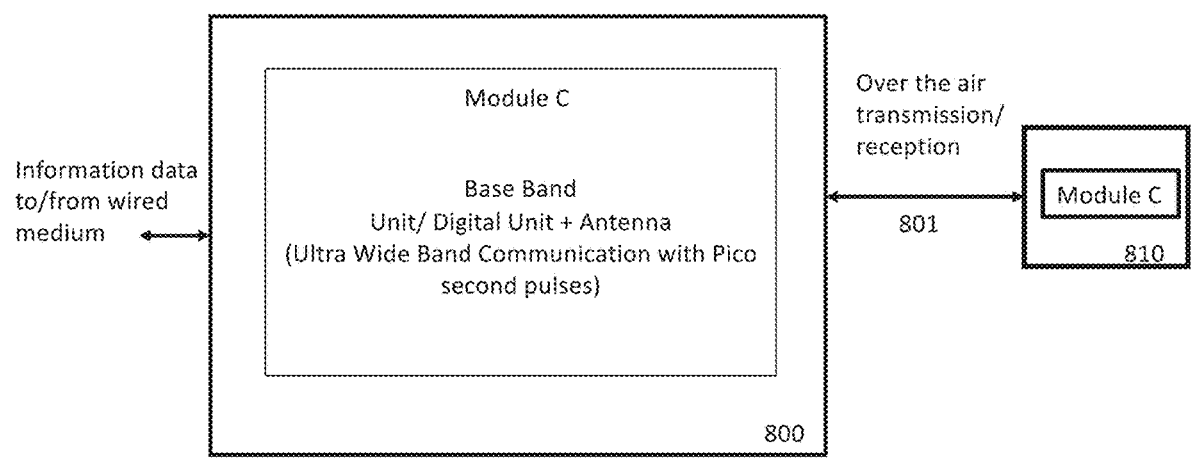
FIG. 8. depicts yet another example wireless communication node comprising a module, in accordance with various aspects of this disclosure.

Referring to FIG. 8, another possible embodiment of wireless communication node 131 of FIG. 1 is shown as wireless communication node 800 and wireless communication node 810. Wireless communication node 800 in FIG. 8 comprises a module labeled as "Module C." Module C comprises a base band unit or digital unit which runs the physical layer level protocol including digital modulation/demodulation (modem) and other higher layer protocols such as MAC layer etc. Module C's baseband unit interacts with other nodes of a communication network that are external to the wireless communication node 800 via wired medium.

Module C also includes an ultra-wide band antenna embedded with the baseband unit. Module C is capable of generation, transmission, and reception of extremely short duration pulses (few pico seconds long) and uses pulse modulation (and its variations such as pulse amplitude modulation, etc.) to transmit data at extremely high rates (e.g., greater than 100 Gbps) by transmitting signals over a very wide range of frequencies. In one embodiment, pulses used for communication by Module C can use frequencies ranging from few hundred megahertz to few hundred gigahertz. One of ordinary skill in the art will appreciate that the range of frequencies used by pulses generated by Module C of wireless communication unit 800 can take a different range as well. Moreover, multiple module Cs can be placed together to create a 1, 2, or 3 dimensional array. Elements of this array (e.g., module C) are capable of performing a time synchronized transmission for beam forming. This allows the RF signal energy of the Pico second/UWB pulses to focus in a desired (receiver) direction and can also enable the creation of null or low RF signal energy of the Pico second/UWB pulse in other directions to avoid interference.

One fundamental difference between the characteristic of signals generated by Module C and signals generated by Module A and/or Module B is that these signals generated by Module C are ultra wide band (UWB) signals and their power spectral density over the entire range of frequencies is very low. In this respect, these UWB signals do not create interference with other signals operating on a narrow band of frequencies as these UWB signals are treated as noise by receivers of normal wireless communication nodes.

As further shown in FIG. 8, Module C of wireless communication node 800 and Module C of wireless communication unit 810 establish a link 801 by working together. As explained above, such a communication link 801 operates over an ultra-wide range of frequencies. However, even in the presence of other wireless communication nodes (not shown in FIG. 8) such as wireless communication nodes with Module A or Module B that operate on a narrow band of frequencies compared to Module C of wireless communication node 800, performance of network is not impacted as power spectral density over the frequency range of communication link 801 that overlaps with frequency ranges on which a nearby wireless communication node using narrow band signals using for example Module A and/or Module B operates is very low and is treated as noise by the receivers of Module A and/or Module B.

In another preferred embodiment, in line with the discussion above, wireless communication node 131 in FIG. 1 can host two types of modules. This allows a wireless communication node to communicate simultaneously with multiple wireless communication nodes and with two different interference profiles.

Figure 9:
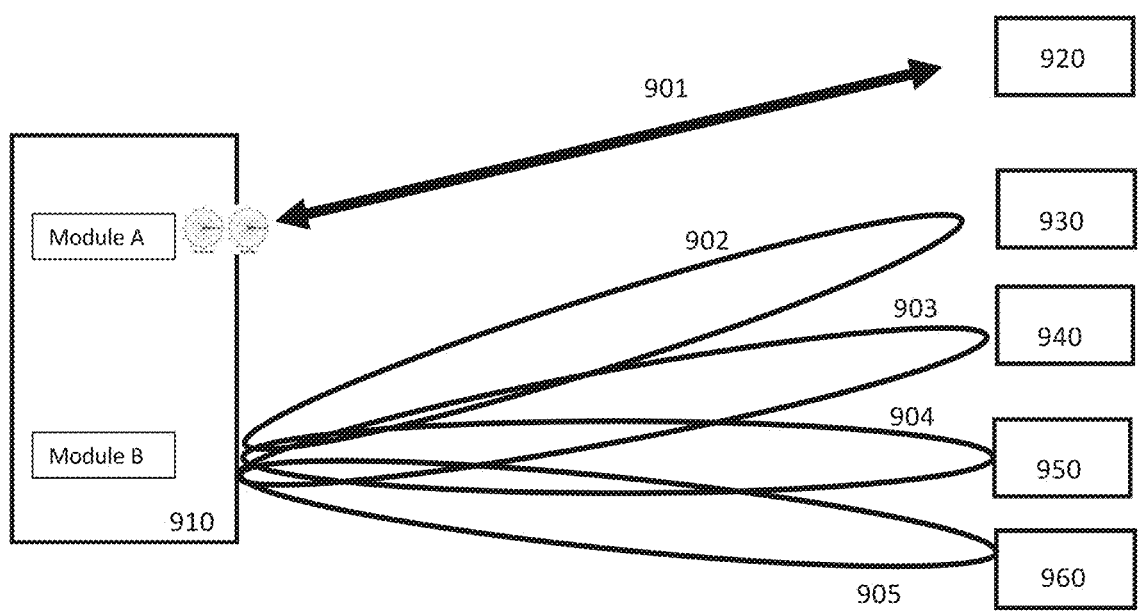
FIG. 9 depicts an example wireless communication node comprising two modules, in accordance with various aspects of this disclosure.

As one example to illustrate, referring to FIG. 9, wireless communication node 910 hosts one Module A and one Module B. Module A of wireless communication node 910 and a communication module of wireless communication node 920 work together to establish extremely narrow bi-directional beam-based link 901 to provide wireless connection between wireless communication nodes 910 and 920. Simultaneously, Module B of wireless communication node 910 which is based on AAS and generates multiple beams simultaneously creates a point-to-multipoint link that connects wireless communication node 910 with wireless communication nodes 930, 940, 950 and 960. Specifically, Module B of wireless communication node 910 coordinates with (1) a module of wireless communication node 930 to establish bi-directional beam 902, (2) a module of wireless communication node 940 to establish bi-directional beam 903, (3) a module of wireless communication node 950 to establish bi-directional beam 904, and (4) a module of wireless communication node 960 to establish bi-directional beam 905. In one embodiment, extremely narrow beam 901 and group of beams including 902, 903, 904 and 905 may all operate within the same range of carrier frequencies at a given time. In another embodiment, extremely narrow beam 901 may operate within a different range of frequencies compared to the range of frequencies used by the group of beams including 902, 903, 904 and 905 at a given time.

In one embodiment, Module A and Module B of wireless communication node 910 can be inside the same physical enclosure. In other embodiments, Module A and Module B of wireless communication node 910 can be inside two separate physical enclosures. In such embodiments where Module A and Module B belong to the same wireless communication node contained in separate physical enclosures, Module A and Module B can be connected via a wired link as they are co-located in the same seed home or anchor home.

In FIG. 9, a maximum of two modules (i.e., a single Module A and a single Module B) are shown to be contained in a wireless communication node 910 that enables the wireless communication node to establish two independent and different types of bi-directional links with different wireless communication nodes simultaneously. However, it should be understood that wireless communication node 910 can host more than two modules (e.g., a combination of one or more Module As and one or more Module Bs) and the maximum number of total modules that a wireless communication node can host may depend on the maximum total power available to the wireless communication node. Further, it should be understood that in one embodiment, all modules belonging to same wireless communication node may operate on the same carrier frequencies of a frequency band but in other embodiments, different modules belonging to the same wireless communication node may operate on different carrier frequencies of a frequency band.

As noted above, wireless communication nodes 131 in FIG. 1 can host more than one type of module. This allows a wireless communication node to communicate simultaneously with multiple wireless communication nodes and with different interference profiles.

Figure 10:
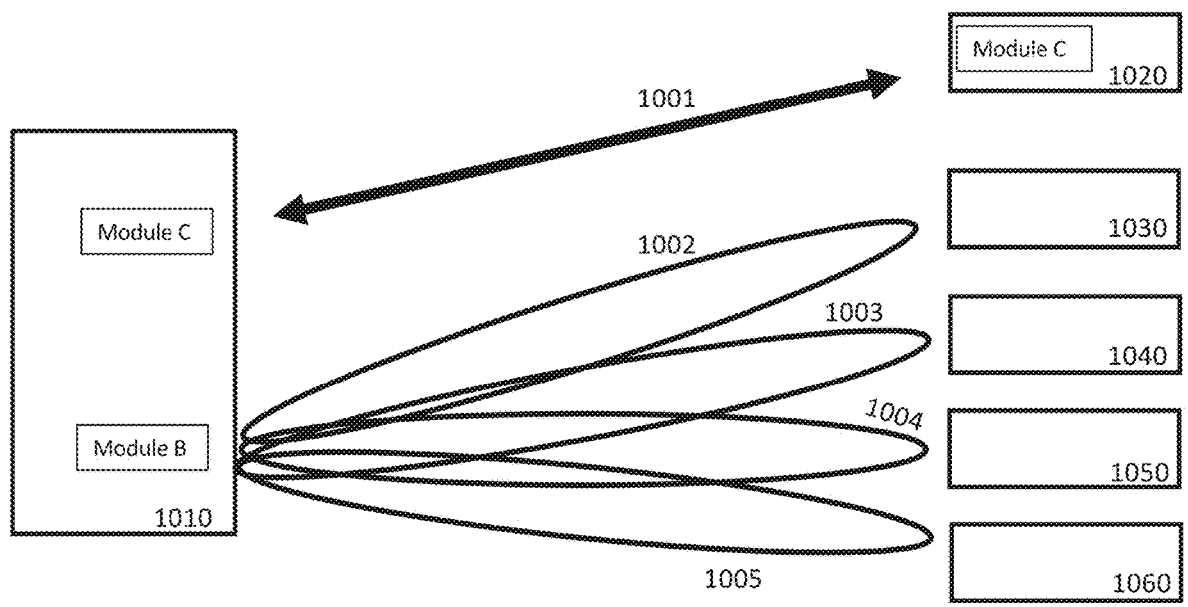
FIG. 10 depicts another example wireless communication node comprising two modules, in accordance with various aspects of this disclosure.

As another example to illustrate, referring to FIG. 10, wireless communication node 1010 hosts one Module C and one Module B. Module C of wireless communication node 1010 and Module C of wireless communication node 1020 work together to establish extremely high data rate ultra-wide frequency and low power spectral density beam-based link 1001 to provide wireless connection between wireless communication nodes 1010 and 1020. Module B of wireless communication node 1010, which is based on AAS and generates multiple beams simultaneously, creates a point-to-multipoint link that connects wireless communication node 1010 with wireless communication nodes 1030, 1040, 1050 and 1060. Specifically, Module B of wireless communication node 1010 coordinates with (1) a module of wireless communication node 1030 to establish bi-directional beam 1002, (2) a module of wireless communication node 1040 to establish bi-directional beam 1003, (3) a module of wireless communication node 1050 to establish bi-directional beam 1004, and (4) a module of wireless communication node 1060 to establish bi-directional beam 1005.

In one embodiment, Module C and Module B of wireless communication node 1010 can be inside same physical enclosure. In other embodiments, Module C and Module B of wireless communication node 1010 can be inside two separate physical enclosures. In such an embodiment where Module C and Module B belong to the same wireless communication node contained in separate physical enclosures, Module C and Module B can be connected via a wired link as they are co-located in same seed home or anchor home.

In FIG. 10, a maximum of two modules (i.e., a single Module C and a single Module B) are shown to be contained in a wireless communication node 1010 that enables the wireless communication node to establish two independent and different types of bi-directional links with different wireless communication nodes simultaneously. However, it should be understood that wireless communication node 1010 can host more than two types of module (e.g., a combination of Module A, Module B and/or Module C) and the maximum number of total modules that a wireless communication node can host may depend on the maximum total power available to the wireless communication node. It should be also understood that in one embodiment, all modules belonging to same wireless communication node may operate on same carrier frequencies of a frequency band, while in other embodiments, different modules belonging to same wireless communication node may operate on different carrier frequencies of a frequency band.

In another preferred embodiment, wireless communication nodes 131 in FIG. 1 can host more than one type of module and dynamically change the type of link between wireless communication nodes. This allows a wireless communication node to communicate simultaneously with multiple wireless communication nodes and with different interference profiles and to adapt with changes in network environment.

Figure 11A:
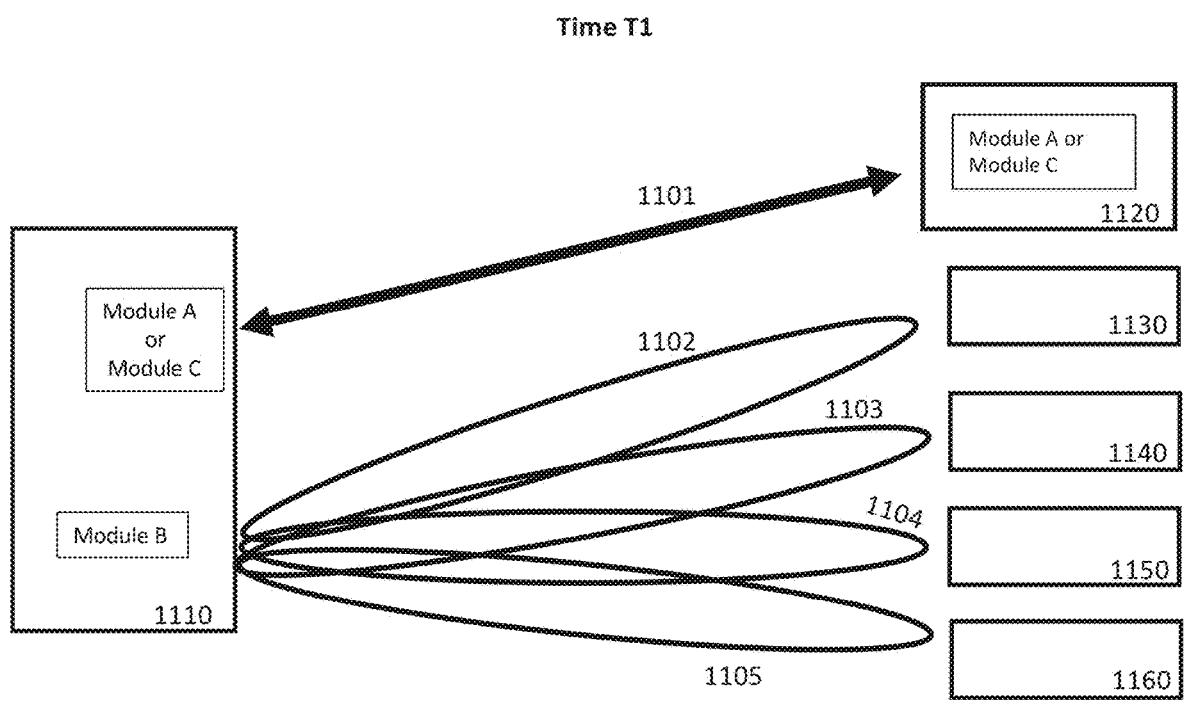
FIG. 11A depicts an example wireless communication node at a given time that can dynamically change type of links between wireless communication nodes, in accordance with various aspects of this disclosure.

As one example to illustrate, referring to FIG. 11A, wireless communication node 1110 hosts a Module C or Module A along with a Module B. During time T1, Module A/Module C of wireless communication node 1110 and communication module of wireless communication node 1010 work together to establish either an extremely high date rate ultra-wide frequency low power spectral density beam or extremely narrow beam-based link 1101 to provide wireless connection between wireless communication nodes 1110 and 1120. At substantially the same time duration T1, Module B of wireless communication node 1110 which is based on AAS and generates multiple beams simultaneously creates a point-to-multipoint link that connects wireless communication node 1110 with wireless communication nodes 1130, 1140, 1150 and 1160. Specifically, Module B of wireless communication node 1110 coordinates with (1) a module of wireless communication node 1130 to establish bi-directional beam 1102, (2) a module of wireless communication node 1140 to establish bi-directional beam 1103, (3) a module of wireless communication node 1150 to establish bi-directional beam 1104, and (4) a module of wireless communication node 1160 to establish bi-directional beam 1105.

Figure 11B:
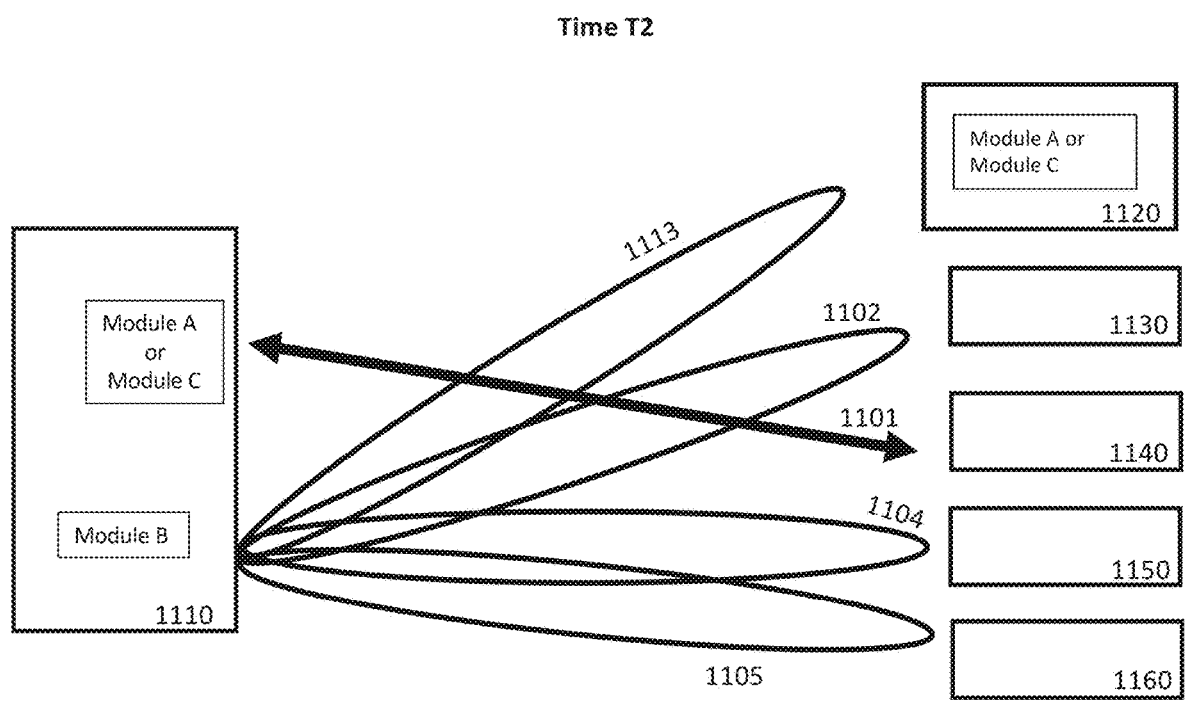
FIG. 11B depicts an example wireless communication node at another given time that can dynamically change type of links between wireless communication nodes, in accordance with various aspects of this disclosure.

Referring to FIG. 11B, at a different time T2, due to some trigger, Module A/Module C of wireless communication node 1110 may dynamically switch its wireless link from wireless communication node 1120 to wireless communication node 1140 by steering the beam towards wireless communication node 1140. At the same time or after receiving instructions from a higher layer, Module B of wireless communication node 1110 disconnects its link with wireless communication node 1140 via beam 1103 and generates a new beam 1113 in the direction of wireless communication node 1120 and establishes connection with wireless communication node 1120. Trigger for this beam steering can be due to changes in the link condition between wireless communication node 1110 and wireless communication node 1120 or 1140, which may involve various factors, including but not limited to change from a LOS path to a non-LOS path due to a change in environment, increased interference, a change in position of wireless communication node 1120 or 1140 with respect to wireless communication node 1110, instructions from higher layers, etc.

As shown in FIGS. 11A-B, dynamic link switching may occur between wireless communication nodes 1110, 1120 and 1140. However, it should be understood that dynamic switching can also occur between different communication nodes.

In some instances, one or more wireless communication nodes may leave the communication network. In such case, links between nodes may be dropped and the communication network may dynamically re-align itself by adjusting/switching link types between the remaining number of wireless communication nodes in the communication network to best suit the needs to the wireless communication nodes and the communication network.

In some embodiments, wireless communication nodes 1120, 1130, 1140, 1150 and 1160 can host multiple modules of the same or different types. For example, one or more of wireless communication nodes 1120, 1130, 1140, 1150 and 1160 can host one Module A and one Module B. Hence, when wireless communication node 1110 makes a point-to-point link using its Module A or Module C with a first communication module (e.g., Module A or C) of wireless communication nodes 1120, 1130, 1140, 1150 and 1160, then a second communication module (e.g., Module B) of wireless communication nodes 1120, 1130, 1140, 1150 and

1160 can simultaneously create point-to-multipoint wireless communication links with other modules of wireless communication nodes in the mesh network that are not shown here. Similarly, when wireless communication node 1110 makes a point-to-multipoint link using its Module B with the first communication module (e.g., Module A or C) of wireless communication nodes 1120, 1130, 1140, 1150 and 1160, then the second communication module (e.g., Module B) of wireless communication nodes 1120, 1130, 1140, 1150 and 1160 can simultaneously create point-to-multipoint wireless communication links with other modules of wireless communication nodes in the mesh network that are not shown here.

As another example, one or more of wireless communication nodes 1120, 1130, 1140, 1150 and 1160 can host two Module As or Module Cs. Hence, when wireless communication node 1110 makes a point-to-point link using its Module A or Module C with the first Module A or C of wireless communication nodes 1120, 1130, 1140, 1150 and 1160, then the second Module A or Module C of wireless communication nodes 1120, 1130, 1140, 1150 and 1160 can simultaneously create point-to-point wireless communication links with other modules of wireless communication nodes in the mesh network that are not shown here. Similarly, when wireless communication node 1110 makes a point-to-multipoint links using its Module B with the first communication modules (Module A or C) of wireless communication nodes 1120, 1130, 1140, 1150 and 1160, then the second Module A or C of wireless communication nodes 1120, 1130, 1140, 1150 and 1160 can simultaneously create point-to-point wireless communication links with other modules of wireless communication nodes in the mesh network that are not shown here.

As yet another example, wireless communication nodes 1120, 1130, 1140, 1150 and 1160 can host multiple Module As or Module Cs and a Module B. For instance, one or more of wireless communication nodes 1120, 1130, 1140, 1150 and 1160 can host two Module As or Module Cs and one Module B. Hence, when wireless communication node 1110 makes a point-to-point link using its Module A or Module C with a first Module A or C of wireless communication nodes 1120, 1130, 1140, 1150 and 1160, then a second Module A or Module C of wireless communication nodes 1120, 1130, 1140, 1150 and 1160 can simultaneously create point-to-point wireless communication links with a third communication module (e.g., Module B) of wireless communication nodes 1120, 1130, 1140, 1150 and 1160 can simultaneously create point-to-multipoint wireless communication links with other modules of wireless communication nodes in the mesh network that are not shown here. Similarly, when wireless communication node 1110 makes a point-to-multipoint link using its Module B with the first communication module (e.g., Module A or C) of wireless communication nodes 1120, 1130, 1140, 1150 and 1160, then the second communication module (e.g., Module A or C) of wireless communication nodes 1120, 1130, 1140, 1150 and 1160 can simultaneously create point-to-point wireless communication links with other modules of wireless communication nodes in the mesh network that are not shown here and a third communication module (e.g., Module B) of wireless communication nodes 1120, 1130, 1140, 1150 and 1160 can simultaneously create point-to-multipoint wireless communication links with other modules of wireless communication nodes in the mesh network that are not shown here.

It is to be noted that wireless communication links established by Module A or Module C have high reliability due to interference immunity either due to extremely narrow beams or due to transmission of data over ultra-high bandwidth. These features make these links more suitable to carry control information and data for multiple users of a wireless communication mesh network. Hence links established by Module A or Module C can act as a wireless backhaul for a mesh network while links established with Module B can provide access to individual users of a communication network.

In one embodiment, an entire wireless mesh can be composed of point-to-point links where both links providing backhaul and access have interference immunity. Although such links are more expensive due to the requirement of separate modules to establish individual links, such links are suitable when certain high service quality or reliability is required to be ensured for all customers of the network.

Figure 12:
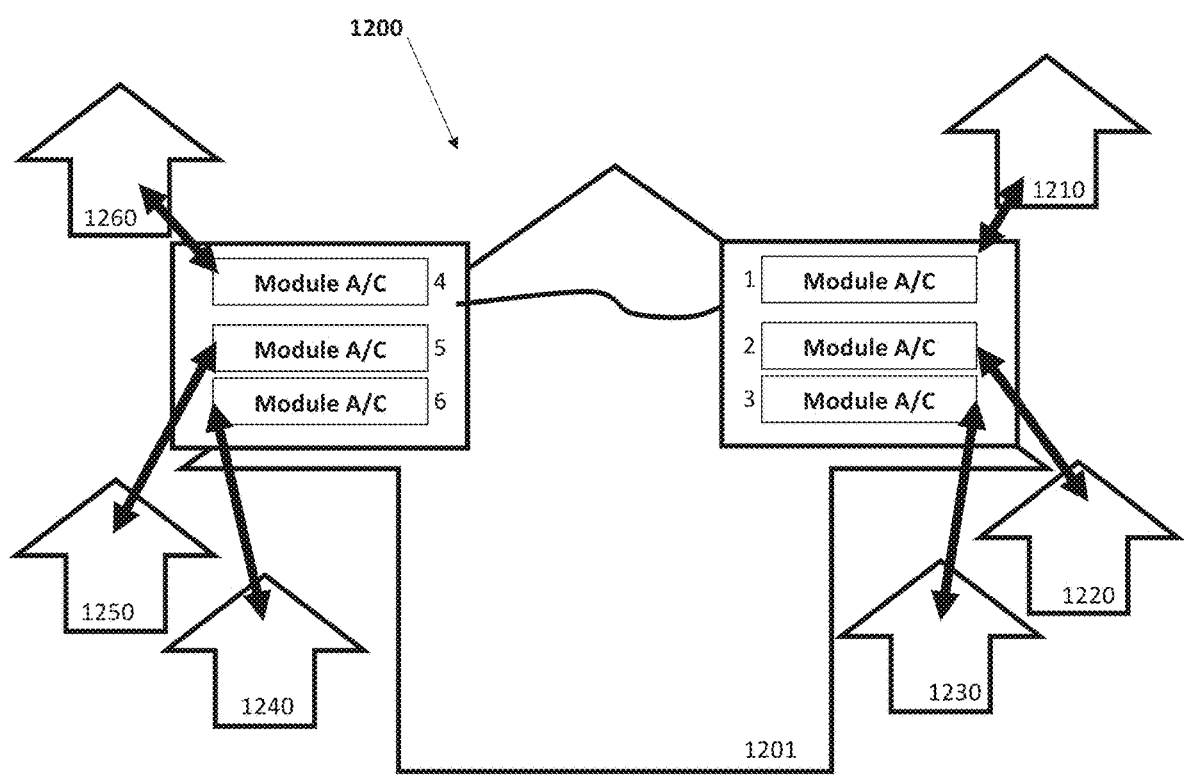
FIG. 12 depicts an example location of a communication network that can be a seed or an anchor home, in accordance with various aspects of this disclosure.

For example, FIG. 12 shows a location 1200 of a communication network that can be a seed or an anchor home. Location 1200 hosts a wireless communication node 1201 that contains a total of 6 communication modules that belong to either Module A or Module C. Hence wireless communication node 1201 is capable of establishing six point-to-point links. As shown, wireless communication node 1201 uses a $1^{st}$ and $4^{th}$ Module A/Module C to establish connections with location 1210 and location 1260 that serve as backhaul links, while wireless communication node 1201 uses a $2^{nd}$, $3^{rd}$, $5^{th}$ and $6^{th}$ Module A/Module C to establish point-to-point links with location 1220, 1230, 1250 and 1240 to provide access links. In this respect, links between locations 1200 and 1220, locations 1200 and 1230, locations 1200 and 1240, and locations 1200 and 1250 only carry data for individual users, whereas links between locations 1200 and 1260 and locations 1200 and 1210 carry signaling and data for all the locations including 1200, 1210, 1220, 1230, 1240, 1250 and 1260.

In another embodiment, an entire wireless mesh can be composed of combination of point-to-point links and point-to-multipoint links where point-to-point links act as backhaul links and point-to-multipoint links act as access links to individual users. Although such wireless mesh networks due to presence of point-to-multipoint links provide interference immunity to all the users of the communication network, such wireless mesh networks are less expensive due to the non-requirement of separate modules to establish individual links.

Figure 13:
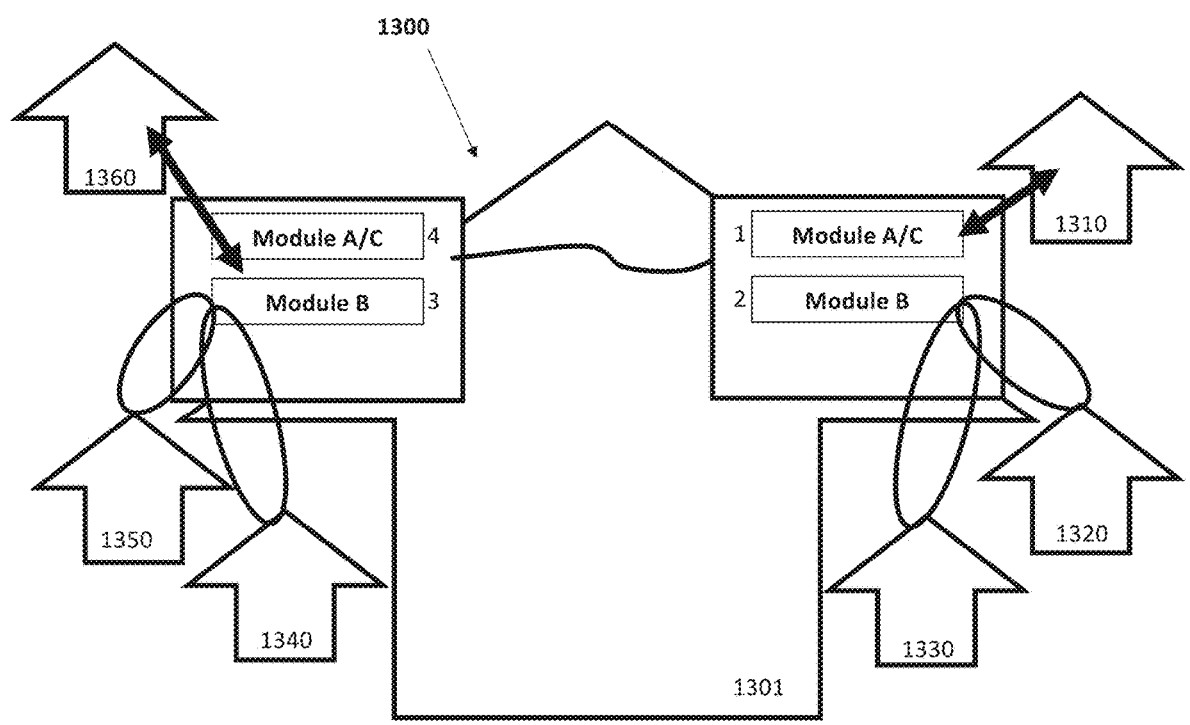
FIG. 13 depicts another example location of a communication network that can be a seed or an anchor home, in accordance with various aspects of this disclosure.

For example, FIG. 13 shows a location 1300 of a communication network that can be a seed or an anchor home. Location 1300 hosts a wireless communication node 1301 that contains a total of 4 communication modules that belong to either Module A/Module C or Module B. Hence this wireless communication node is capable of establishing two point-to-point links and two point-to-multipoint links. As shown, wireless communication node 1301 uses a $1^{st}$ and $4^{th}$ Module A/Module C to establish connections with location 1310 and location 1360 that serve as backhaul links, while wireless communication node 1301 uses a $2^{nd}$ Module B to establish point-to-multipoint links with locations 1320, 1330 and uses a $3^{rd}$ Module B to establish point-to-multipoint links with locations 1350 and 1340 to provide access links. In other words, links between locations 1300 and 1320, locations 1300 and 1330, locations 1300 and 1340 and locations 1300 and 1350 only carry data for individual users, whereas links between locations 1300 and 1360 and locations 1300 and 1310 carry signaling and data for all the locations including 1300, 1310, 1320, 1330, 1340, 1350 and 1360.

Figure 14:
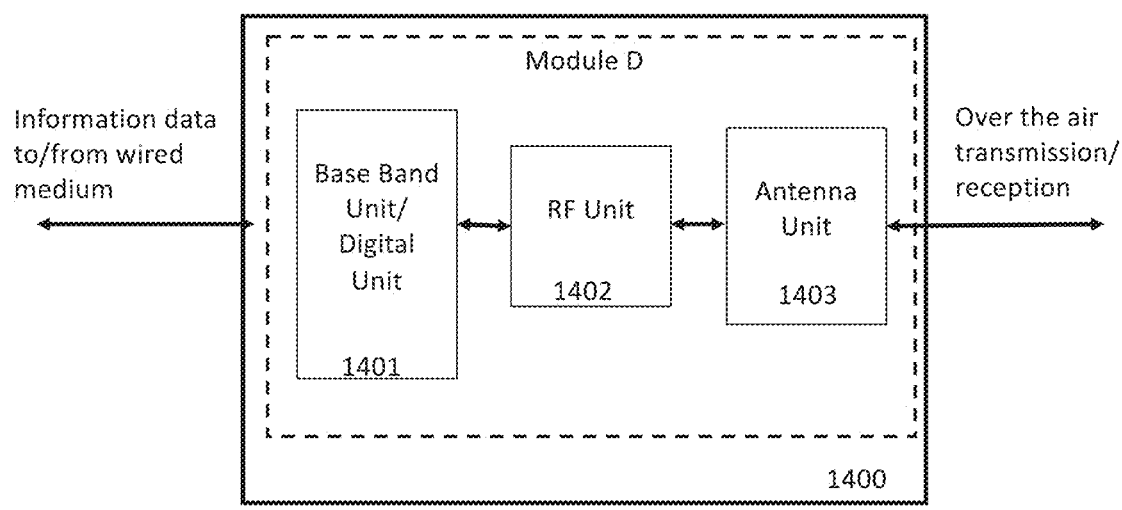
FIG. 14 depicts another example wireless communication node comprising a module, in accordance with various aspects of this disclosure.

Referring to FIG. 14, another possible embodiment of wireless communication node 131 of FIG. 1 is shown as wireless communication node 1400. Wireless communication node 1400 comprises a single module labeled as "Module D." Module D comprises base band unit or digital unit 1401 which runs the physical layer level protocol including digital modulation/demodulation (modem) and other higher layer protocols such as MAC layer, etc. Base band unit 1401 interacts with other nodes of the communication network that are external to the wireless communication node 1400 via wired medium.

Module D also includes RF unit 1402, which among other things processes intermediate frequency (IF) signals and defines the frequency range of the radio signals that can be transmitted or received with the Module D. RF unit 1402 is capable of operating over a wide range of frequencies (e.g., 5 Ghz band frequencies ranging from 5 Ghz to 6 Ghz).

Further, as shown, Module D also comprises antenna unit 1403 which performs the transmission and reception of over the air radio signals. Antenna unit 1403 is capable of transmitting and receiving extremely narrow beam of signals. Antenna unit 1403 may be constructed with either 1-dimensional or 2-dimensional antenna element arrays that have excellent properties of controlling the directionality of radio signals using beam forming and can propagate even in a non-line of sight environment. Module D with the help of antenna unit 1403 is capable of establishing point-to-multipoint links with a tower capable of performing massive MIMO (multiple input multiple output) beams. In one embodiment, Module D can be designed and manufactured at least in part using ASIC (Application specific integrated circuit) and an integrated RF unit called RFIC.

Figure 15:
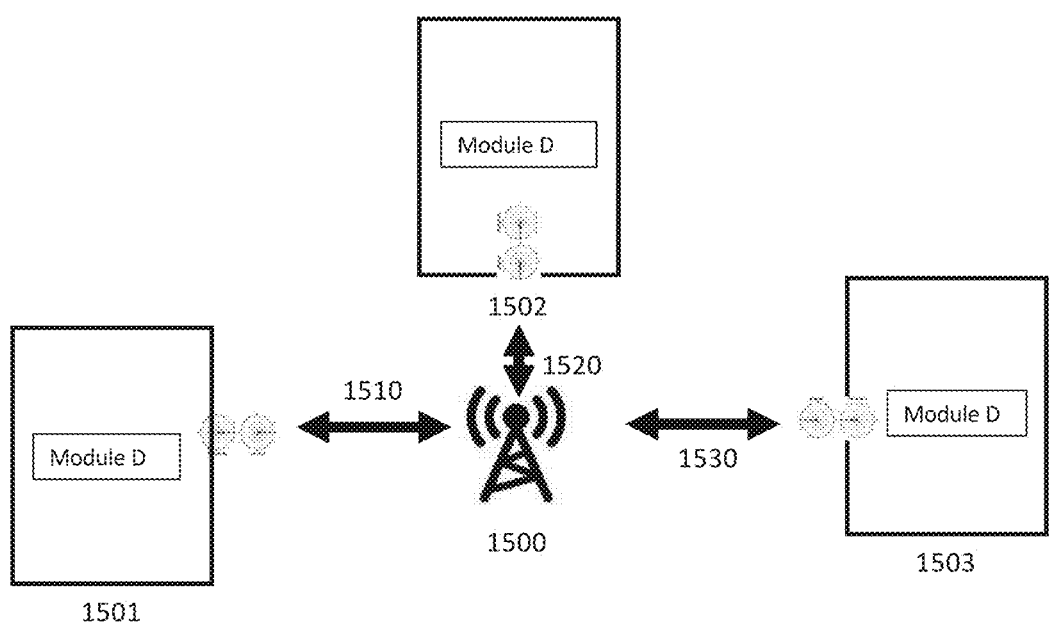
FIG. 15 depicts an example of multiple modules connected to a tower, in accordance with various aspects of this disclosure.

Referring to FIG. 15, an example of multiple Module Ds connected to a tower 1500 is shown. Specifically, wireless communication node 1501 hosting a Module D described above is connected to tower 1500 via massive MIMO beam link 1510 that can be both line-of-sight and non-line-of-sight, wireless communication node 1502 hosting a Module D described above is connected to tower 1500 via massive MIMO beam link 1520 that can be both line-of-sight and non-line-of-sight, and wireless communication node 1503 hosting a Module D described above is connected to tower 1500 via massive MIMO beam link 1530 that can be both line-of-sight and non-line-of-sight. The tower 1500 is equipped with a Massive MIMO module that can create multiple bi-directional narrow beam links simultaneously in all directions with 360 degrees of coverage area. In one embodiment, tower 1500 can operate in the 5 Ghz band including frequencies ranging from 5000 Mhz to 6000 Mhz. In other embodiments, tower 1500 and associated wireless communication nodes 1501, 1502 and 1503 can operate within a different frequency band.

It should be understood that while FIG. 15 shows only one tower and three wireless communication nodes hosting Module D in the network, a given network can have multiple towers similar to tower 1500 and these towers can each be connected to a large number of wireless communication nodes hosting various other modules.

In accordance with the present disclosure, the route that a particular packet takes from a source to a destination may be dynamically selected based on factors including but not limited to link quality, loading, latency etc. For example, referring to FIG. 16, communication system 1600 is shown that is similar to communication system 100 and has all the components described in the context of FIG. 1. Additionally, system 1600 of FIG. 16 includes a tower 1610 which is similar to tower 1500 described in the context of FIG. 15. In contrast to communication system 100 in FIG. 1, wireless communication nodes 131, 132, 133, 134 and 135 host an additional Module D besides Module A/Module B or Module C that enables these wireless communication nodes to optionally establish bi-directional links with features described in the context of FIGS. 14-15 with tower 1610 using massive MIMO beamforming capabilities. Such links labeled as 1601, 1602, 1603, 1604 and 1605 can work in both line-of-sight and non-line of sight environment and can provide alternate communication path to wireless communication nodes 131, 132, 133, 134 and 135 in an event where point-to-point or point-to-multipoint links that connect one wireless communication node to a peer wireless communication node to form a mesh network fails or experience performance degradation due to various reasons including but not limited to change on the line-of-sight profile of millimeter wave link between two wireless communication nodes.

Figure 16:
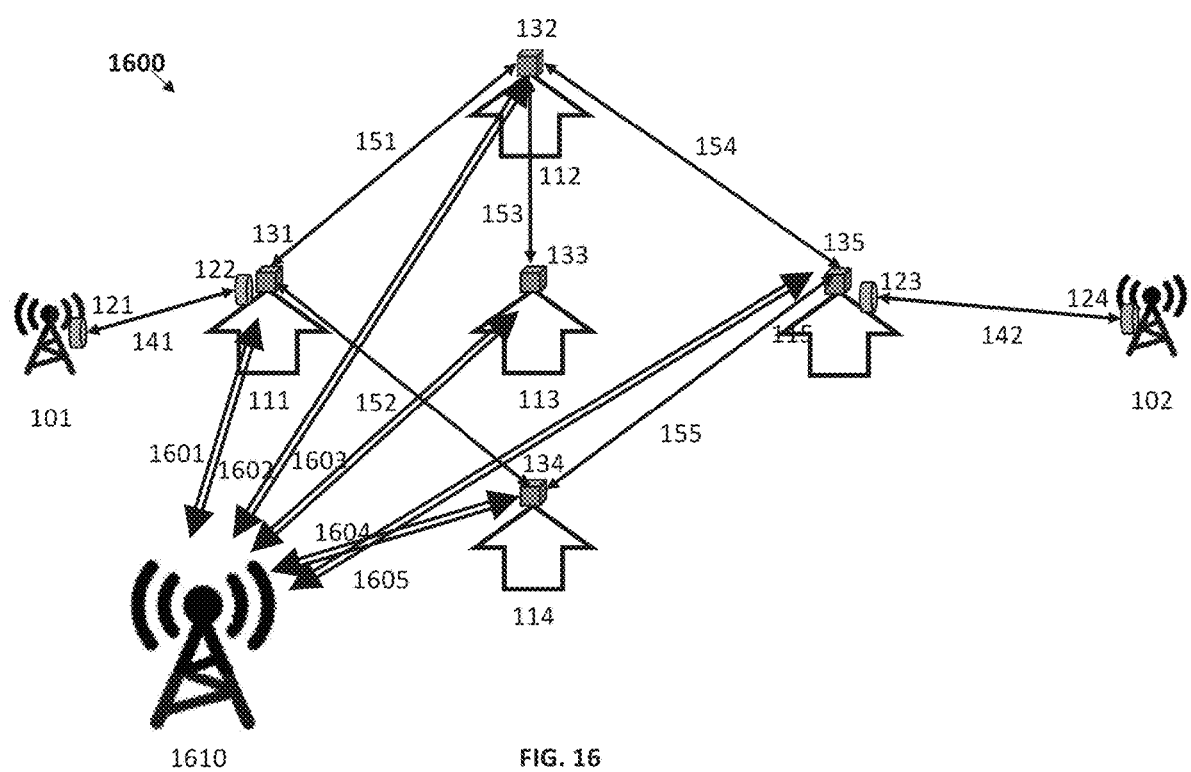
FIG. 16 depicts another example diagram relating to a wireless networking and communication system, in accordance with various aspects of this disclosure.

In FIG. 16, only one tower (i.e., tower 1610) capable of massive MIMO point-to-multipoint communication is shown to be connected to five wireless communication nodes 131-135. However, it should be understood that a communication system can also have more than one tower, each connected to multiple different wireless communication nodes hosting various other modules.

In areas within tower 1500's (and other towers of same type) coverage area, a given communication network can initially start in a point-to-multipoint manner, where tower 1500 (and other towers of same type) provides access to individual customers using sub 6 Ghz massive MIMO point-multipoint beams. Later, nodes in the given communication network can opportunistically connect with other nodes using regular modules (e.g. Module A/Module B/Module C) in the presence of line-of-sight. This way, the given communication network may evolve into a mesh network with point-to-point and point-to-multipoint connection between nodes in addition to each communication node having a path directly (non-line-of-sight) to tower 1500 (and other towers of same type) that fall within the coverage area.

One of ordinary skill in the art will appreciate that a route a given packet takes from a source to a destination in this network may be optimized by considering various factors including latency, congestion, reliability etc. One of ordinary skill in the art will also appreciate that a given communication network can later add seed homes (e.g., seed homes 111 and 115 in FIG. 1) along with tower/fiber access points 101 and 102 to provide alternate backhaul as per need basis.

In another embodiment, instead of providing massive MIMO point-to-multipoint networking capability using a terrestrial tower, point-to-multipoint massive MIMO capability to networks wireless communication nodes can also be provided by a satellite for example a low earth orbit (LEO) satellite. For example, referring to FIG. 17, communication system 1700 is shown that is similar to communication system 100 and has all the components described in the context of FIG. 1. Additionally, system 1700 of FIG. 17 includes a satellite 1710 which is capable of massive MIMO transmission and reception on frequencies including but not limited to 5-6 Ghz, similar to tower 1500 described in the context of FIG. 15. In contrast to communication system 100 in FIG. 1, wireless communication nodes 131, 132, 133, 134 and 135 host an additional Module D (besides Module A/Module B or Module C) that enables these wireless communication nodes to optionally establish bi-directional links with features described in the context of FIGS. 14-15 with satellite 1710 using massive MIMO beamforming capabilities. Such links labelled as 1701, 1702, 1703, 1704 and 1705 can provide alternate communication path to wireless communication nodes 131, 132, 133, 134 and 135 in an event where point-to-point or point-to-multipoint links that connect one wireless communication node to a peer wireless communication node to form a mesh network fails or experience performance degradation due to various reasons including but not limited to change on the line-of-sight profile of millimeter wave link between two wireless communication nodes.

Figure 17:
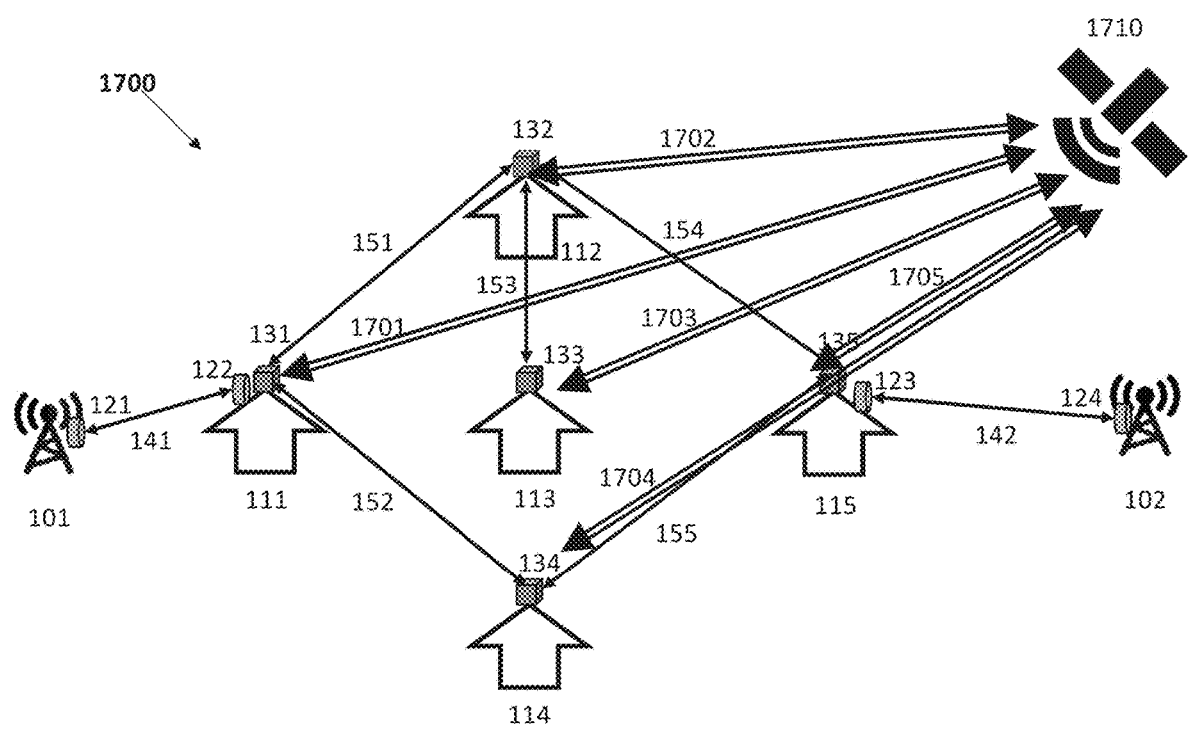
FIG. 17 depicts yet another example diagram relating to a wireless networking and communication system, in accordance with various aspects of this disclosure.

In FIG. 17, only one satellite 1710 capable of massive MIMO point-to-multipoint communication is shown to be connected to five wireless communication nodes 131-135. However, it should be understood that a communication system can also have more than one satellite, each connected to multiple different wireless communication nodes hosting various other modules.

In another embodiment, some of the wireless communication nodes that provide backhaul functionality can be equipped with multiple communication modules that enable these wireless communication nodes to provide transport backhaul data between an end user and a network using multiple different types of communication links. For example, referring to FIG. 18, communication system 1800 is shown that is similar to communication system 100 and has all the components described in the context of FIG. 1. Additionally, system 1800 of FIG. 18 includes a satellite 1810 which is capable of massive MIMO transmission and reception on frequencies including but not limited to 5-6 Ghz, similar to tower 1500 described in the context of FIG. 15. System 1800 also includes a massive MIMO cable tower 1820 which is also similar to tower 1500 described in the context of FIG. 15.

Figure 18:
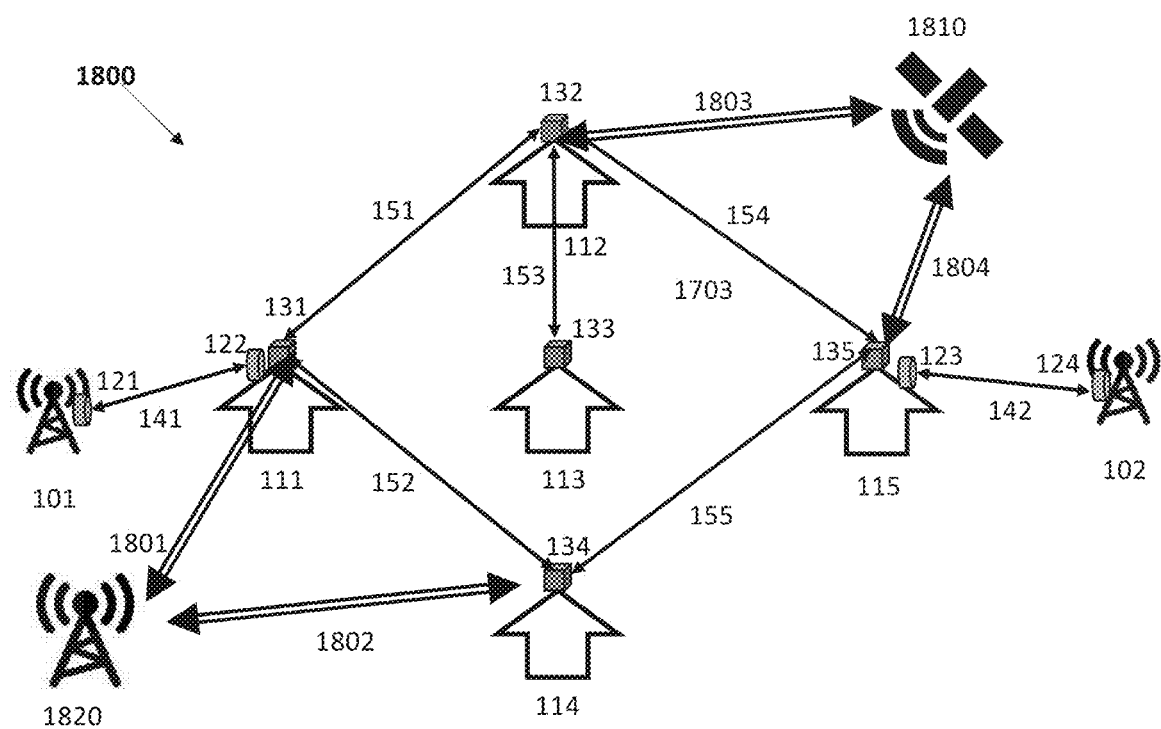
FIG. 18 depicts still another example diagram relating to a wireless networking and communication system, in accordance with various aspects of this disclosure.

In contrast to communication system 100 in FIG. 1, wireless communication nodes 131, 132, 133, 134 and 135 host an additional Module D (besides Module A/Module B or Module C) that enables these wireless communication nodes to optionally establish bi-directional links with features described in the context of FIGS. 14-15 with satellite 1810 and tower 1820 using massive MIMO beamforming capabilities. Such links labeled as 1801, 1802, 1803 and 1804 can provide an alternate communication path to wireless communication nodes 131, 132, 133, 134 and 135 in an event where point-to-point or point-to-multipoint links that connect one wireless communication node to a peer wireless communication node to form a mesh network fails or experience performance degradation due to various reasons, including but not limited to change in the line-of-sight profile of a millimeter wave link between two wireless communication nodes. Specifically, satellite 1810 in FIG. 18 is connected to seed home 115 using wireless communication node 135 via link 1804 and to anchor home 112 using wireless communication node 132 via link 1803. Seed home 115 thus has multiple options to route backhaul traffic to the network.

In one embodiment, seed home 115 using wireless communication node 135 at a given time can pick a satellite link 1804 to transport backhaul data, and based on some trigger at a different time, instruct wireless communication module 135 to switch links for backhaul data transmission from 1804 to a point-to-point or point-to-multipoint millimeter wave (e.g. E-band) based link coupled to tower/fiber access point 102. Such trigger may include latency, bandwidth, packet loss requirements, etc. of a particular application.

FIG. 18 also shows an end user home 113 where wireless communication node 133 transports the data using anchor home 112's wireless communication node 132. Wireless communication node 132 is shown to have multiple options to transport end user data of home 113, including direct satellite link connection using 1803, in-direct satellite link connection using 1804 via anchor node 135, or though point to point/point-multi-point connections using millimeter wave through towers 101 or 102 via seed homes 111 and 115 respectively, among other options.

In one embodiment, wireless communication node 132 can dynamically switch its connection link to route data to and from end user home 113. For example, due to some trigger similar to the triggers described above, wireless communication node 132 can dynamically switch from satellite link 1803 to satellite link 1804 via wireless communication node 135 to transport data to and from end user home 113.

It should be understood that links 1803 and 1804 can be part of same massive MIMO beam or links 1803 and 1804 can be part of different massive MIMO beams. It should also be understood that satellite links 1802 and 1804 can use the same frequency range of communications or can operate in different frequency ranges. Further, while FIG. 18 shows only one satellite (i.e., satellite 1810) capable of massive MIMO point-to-multipoint communication that is connected to two wireless communication nodes 132 and 135, it should be understood that a communication system can also have more than one satellite, each connected to multiple different wireless communication nodes hosting various other modules.

As further shown in FIG. 18, tower 1820 is connected to seed home 111 using wireless communication node 135 via link 1804 and to anchor home 112 using wireless communication node 131 via link 1801 and to anchor home 114 using wireless communication node 134 via link 1802. This provides anchor home 114 with options to route packets to the network in multiple ways including (a) through point-to-point or point-to-multipoint millimeter wave-based links 152 or 155, and (b) via direct massive MIMO based link to tower 1820 via link 1802.

Similarly, seed home 111 has multiple options to route backhaul traffic to the network. In one embodiment, seed home 111 using wireless communication node 131 at a given time can pick a satellite link 1801 to transport backhaul data and based on some trigger at a different time, instruct wireless communication module 131 to switch links for backhaul data transmission from 1801 to a point-to-point or point-to-multipoint millimeter wave (e.g. E-band) based link coupled to tower/fiber access point 101. Such trigger may include latency, bandwidth, packet loss requirements, etc. of a particular application.

In FIG. 18, only one tower (i.e., tower 1820) capable of massive MIMO point-to-multipoint communication is shown to be connected to two wireless communication nodes 131 and 134. However, it should be understood that a communication system can also have a different number of massive MIMO towers, each connected to multiple different wireless communication nodes hosting various other modules.

In another embodiment, one or more wireless communication nodes described above and discussed with respect to FIGS. 1-18 may additionally be an edge computing node by hosting a processor (separate or shared), memory, digital contents, software, and storage, among other components for computing, and other required operations for edge computing, in addition to the high speed low latency networking capability that has already been described above. This enables a given communication system to provide cloud services in a distributed manner closer to an end user as wireless communication nodes are distributed across the network and provide an interface between the network and an end-user. This memory unit can store a copy of local digital contents and can additionally store portions of digital content that are not local. The non-local digital contents among other things can include digital content belonging to other nodes. This provides content redundancy in a communication system. Hence, when an end user of a communication system requests for digital content, then this edge computing mechanism allows a request to be fulfilled in a variety of different ways, including a request processed by a local node and/or remote node based on various criteria including but not limited to latency, network congestion, etc. of the application making the request.

In another embodiment, one or more wireless communication nodes described above and discussed with respect to FIGS. 1-18 can additionally be a blockchain node by hosting a computer comprising at least one processor, memory, digital content, software, etc., which is connected to a blockchain network comprising a client that is capable of storing, validating and/or relaying transactions in addition to the high-speed low latency networking capability that has already been described above. This enables the communication system and its nodes described in this disclosure and discussed in the context of FIGS. 1-18 to provide an ideal platform for blockchain databases, enterprise blockchain databases, permissioned/private blockchains, hybrid and other similar types of databases given that (1) file/data/record storage space is inherently distributed as wireless communication nodes are distributed across the geographical coverage area and (2) low latency communication between the nodes and across the network due to high speed wireless links enable improved latency and improves the transaction throughput of the blockchain based databases.

In another preferred embodiment, one or more wireless communication nodes can additionally act as blockchain-based distributed data storage node by adding dedicated or shared storage capacity capability to these nodes. One key advantage of implementing blockchain-based distributed data storage on a given communication system and the wireless communication nodes described in this disclosure is that storage nodes are inherently distributed, and due to the low latency and high bandwidth of the wireless communication links between the wireless communication node described above and the proximity of the storage location nodes to an end-user, accessing the data content can be faster compared to other approaches.

In accordance with the present disclosure, the wireless mesh network node equipment (point-to-point link modules, point-to-multipoint link modules, multiple point-to-point link modules, combination of multiple point-to-point and point-to-multipoint links, antennas for cellular small cells/CPEs and mmWave equipment, cable, mounts, power supply boxes, etc.) that gets deployed and installed on a rooftop of a private infrastructure such as a single-family home can be consumer financed. For instance, in case of a customer meeting a certain credit score threshold (or any other credit checking criteria), the equipment required to add a millimeter wave mesh node at the customer's premises (i.e., to add the customer to the wireless mesh network) and provide high speed internet service may be financed by a bank on the behalf of the customer, and the customer may agree with the financing bank to re-pay the amount financed by the bank over a certain time period by making periodic (e.g. monthly) payments based on the terms and conditions of the agreement. This way, the customer becomes owner of the equipment (a wireless mesh network node) once the full financed amount is made to the financing bank. This customer can in one embodiment lease back the wireless mesh network node equipment installed on its property to the wireless mesh network operator that installed the wireless mesh network equipment on its property and provide high speed internet data service. In another embodiment, this customer can lease back the wireless mesh network node equipment installed on its property to the wireless mesh network operator that installed the wireless mesh network equipment on its property and provide high speed internet data service for a certain term (e.g., 18 months, 24 months, 36 months, etc.).

In some instances, this customer may be required to lease back the equipment to only that operator which originally installed the equipment at the customer location and provided high speed internet data services. In other instances, this customer can lease back the equipment to any wireless internet network operator. In another instance, lease back of the equipment to an operator other than the operator which originally installed the network equipment at the customer location may only occur with the permission of the wireless internet network operator that originally installed that equipment at customer location. In yet another instance, such lease back to a different wireless internet network operator may only occur after expiration of the lease term with the original wireless internet network operator.

For a wireless internet network operator building and operating a wireless mesh network, the type of customer financing-based network deployment described above becomes a crowd sourcing or crowdfunding-based infrastructure roll out mechanism, where instead of one or few large entities, CAPEX is sourced from a pool of individuals who in some instances are the customers of the wireless mesh network operator. Such customers can get high speed internet data service from the wireless mesh network operator (operating using ptp/ptmp modules, other communication nodes and equipment and various variations discussed earlier in this disclosure) at a subsidized/discounted rate. In certain cases, such customers may get two separate bills periodically, one for the high-speed internet data service and other for the equipment financing from bank. In another case, customers can get a single consolidated bill from a wireless mesh operator.

In some instances, all customers of a wireless mesh operator can be based on consumer financing explained above in a neighborhood or market where wireless mesh operator offers its high-speed internet data service. In other instances, wireless mesh network's customers in a market or neighborhood can be financed through a variety of different ways including operator financing where wireless mesh operator pays for the equipment of the wireless mesh node, financed through bundling with a private utility or service that has a relatively smaller market size (e.g. home security/automation, solar energy, etc.) compared to market size of the high speed internet where a bundled service is offered and wireless mesh operator uses the marketing/sales commission received from the private utility or service provider to fund the wireless mesh node equipment, financed through the revenue generated from running blockchain platform based services on the wireless mesh network nodes along with the consumer/customer based financing that is explained earlier in the disclosure.

Further, in accordance with the present disclosure, the communications equipment including various types of ptp/ptmp modules, cellular small cell, etc. that were described above can be used to establish multiple point-to-point and/or point-to-multiple links where both network nodes of a wireless link, one from where a link originates and the second from where a link terminates (in general, nodes can switch roles dynamically between link originator and link terminator based on the direction of data flow), are located at the different customer locations and providing high speed internet service to the dwellers of the property where wireless mesh network node is deployed and installed. In some cases, one of the two nodes of the link can be at a location where the deployed equipment provides high speed internet service to the dwellers of the property at that location. In other instances, both nodes of the link may be at a location where the deployed equipment does not provide high speed internet service to the dwellers of the property at that location.

It should be understood that the length of the communication links of a wireless mesh network describe above may vary. For instance, the length of the communication links of a wireless mesh network established with the help of the various communication modules and equipment described above may be less than 300 meters on average. Alternatively, the length of the communication links of a wireless mesh network can be greater than 300 meters on average as well.

In accordance with the present disclosure, further disclosed herein are communication modules that employ direct RF (microwave/millimeter wave)-to-optical and direct Optical-to-RF (microwave/millimeter wave) conversion. In one example implementation, the high-speed photo detectors can be used that directly translate an optical signal into a microwave signal. One of ordinary skill in the art will appreciate that other approaches can be used for direct optical-to-RF conversion. Similarly, a dipole antenna directly coupled to a plasmonic modulator allows direct conversion from the RF to the optical world. One of ordinary skill in the art will appreciate that different approaches can be used for direct conversion of RF signals to optical signals. This direct optical-to-RF and direct RF-to-Optical conversion modules eliminate the need of the use of analog to digital and digital to analog (ADC/DAC) modules that are required by traditional modem implementations. These mixed signal components (i.e., ADC/DAC) consume high amount of power and also increase the cost as each antenna is required to be connected to a separate ADC/DAC modules.

Figure 19:
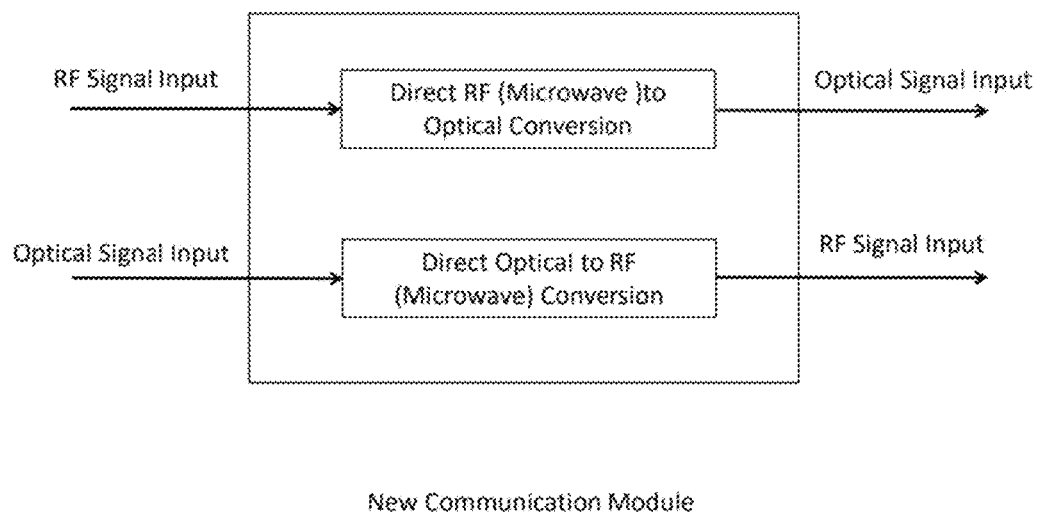
FIG. 19 depicts an example communication module based on direct RF-to-Optical and direct Optical-to-RF conversion, in accordance with various aspects of this disclosure.

FIG. 19 shows a communication module based on direct RF-to-Optical and direct Optical-to-RF conversion. Communication module of FIG. 19 contains a single direct RF-to-Optical sub-module and a single Optical-to-RF sub-module. However, communication module of FIG. 19 can host any integer number of direct RF-to-Optical sub-modules greater than or equal to zero and any integer number of direct Optical-to-RF sub-modules greater than or equal to zero. In one example embodiment, this direct RF-to-Optical and direct Optical-to-RF conversion technology can be implemented is an integrated Circuit (IC) or chip.

Figure 20:
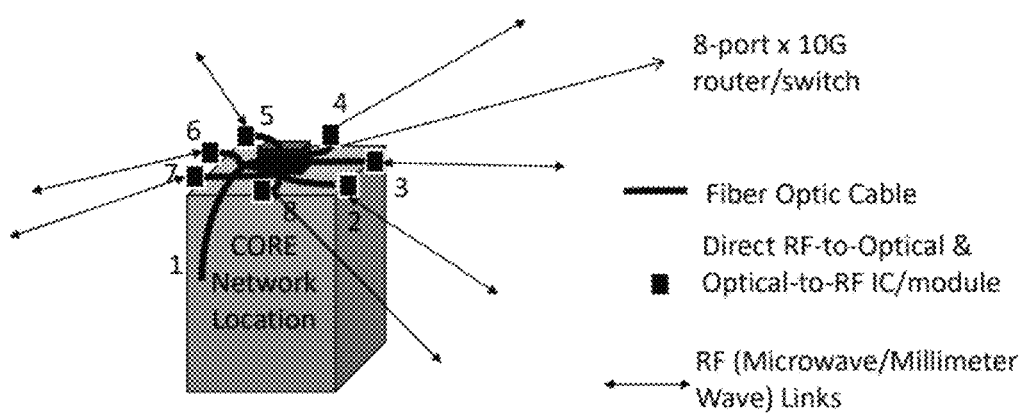
FIG. 20 depicts an example router/switch, in accordance with various aspects of this disclosure.

Based on the above explanation with respect to the example communication module of FIG. 19, in an example embodiment, the core of the wireless mesh network can be a wireline optical or wired router/switch where each port is mapped, either through a direct connection or over optical/wired line, to an individual direct conversion Optical-to-RF or RF-to-Optical chip that then focuses, on both receiver and transmitter side, all RF energy into a high gain narrow beam that can be both fixed or steerable. In one example embodiment, a standard 8-port×10G router/switch could be used, with one port being used as a data drop to local building/site and the other 7 ports being connected over a fiber optic cable to various Optical-to-RF or RF-to-Optical end points that are located at multiple distributed locations external (and/or internal) on/in the building/site as shown in FIG. 20. One of ordinary skill in the art will understand that the router/switch can have a different number of ports as well.

These multiple distributed locations can be determined in advance based on the use of connection potentiality optimization algorithms, where the algorithm understands the relationship between end point placement and potentially connection partners. Also, the individual PtP beams can be dynamically steered among potential PtP connection partners to facilitate path optimization algorithms and/or to respond to network congestion and/or network element failures. In one embodiment, these Optical-to-RF or RF-to-Optical end points that establish ptp/ptmp beams can be placed below a roof's eaves and in other embodiments, these end points can be placed above a roof's eaves. In some other embodiments, some of the Optical-to-RF or RF-to-Optical end points can be placed below a roof's eaves and some can be placed above a roof's eaves and actual placement may depend upon the line-of-sight profile of the location/site.

It should be understood that the example communication module discussed in the context of FIGS. 19-20 can be implemented in other communication modules that were discussed in the context of FIGS. 1-18. For instance, the modules discussed in the context of FIGS. 1-18 can have direct RF-to-Optical and direct Optical-to-RF technology embedded such that the narrow beam, extremely narrow beam, and/or ptp/ptmp/multiple ptp links can be established without the need for ADC/DAC mixed signal circuitry that consumes a high amount of power and requires to be connected individually with each antenna.

In accordance with the present disclosure, a modified version of the communication nodes discussed earlier for building a wireless mesh network will now be discussed. In one embodiment, a communication node can be a flexible millimeter wave radio equipment capable of establishing multiple point-to-point and/or point-to-multipoint links operating over millimeter wave frequencies and can comprise 3 different sub-modules: (1) digital/network module, (2) point-to-point radio module, and (3) point-to-multipoint radio module. A digital/network module is responsible for interfacing the above millimeter wave radio box (communication node) with a backhaul or fiber network. Specifically, it provides switching capability to direct traffic between the point-to-point or point-to-multipoint radio modules of the millimeter wave radio box (communication node) and the fiber or backhaul network. The connectivity between a single or multiple point-to-point and/or point-to-multipoint radio modules of the millimeter wave radio box and the backhaul or fiber network can be based over a variety of interfaces including but not limited to PCI/PCI express bus interface and ethernet.

In one embodiment, PCI/PCIe can be used when a point-to-point or point-to-multi-point radio that needs to be connected is enclosed in the same box with a digital/network module and separation between the digital/network module and the point-to-point module is limited to few inches such as 3-6 inches or less.

In one embodiment, a digital/network module provides connectivity to a single point-to-point or point-to-multipoint module over a single PCI/PCIe bus interface. In a different embodiment, a digital/network module provides connectivity to 3 point-to-point or 3 point-to-multipoint or a combination of 3 point-to-point/point-to-multipoint modules over three separate PCI/PCIe bus interfaces. In another embodiment, a digital/network module provides connectivity to N point-to-point or N point-to-multipoint or a combination of N point-to-point/point-to-multipoint modules over N separate PCI/PCIe bus interfaces, where N is a positive integer number greater than zero.

An ethernet interface such as an RJ45 port with multi-gigabit support, including but not limited to 1 Gb, 2.5 Gb, 5 Gb, 10 Gb, etc., can be used to connect point-to-point or point-to-multipoint radio modules with a digital/network module. In one embodiment, an ethernet interface can be used when the point-to-point or point-to-multi-point radio that needs to be connected is not enclosed in the same box with a digital/network module and separation between digital/network module and the point-to-point module is greater than 3-6 inches. In some embodiments, the length can be 10 meters or more.

In one embodiment, a digital/network module provides capability of connecting up to 4 point-to-point/point-to-multipoint radios or up to 3 point-to-point/point-to-multi-point radio and a small cell over 4 ethernet interfaces. In a different embodiment, a digital/network module provides capability of connecting up to N point-to-point/point-to-multipoint radios or up to N−1 point-to-point/point-to-multipoint radio and a small cell over N ethernet interfaces, where N is a positive integer number greater than zero. Digital/network module also contains SFP/SFP+interface or any other interface to connect digital/network module with fiber/backhaul network.

The point-to-multipoint radio module of the communication node discussed above is responsible for establishing point-to-multipoint millimeter wave based bi-directional links to connect to peer millimeter wave radios in the network. point-to-multipoint radio module consists of baseband sub-module and RF module. Baseband module handles the baseband processing and among other aspects is responsible for baseband processing related to beamforming. RF module contains phased antenna array that works in conjunction with baseband module to generate point-to-multipoint millimeter wave beams.

The point-to-point radio module of the communication node described above is responsible for establishing point-to-point millimeter wave based bi-directional links to connect to a peer millimeter wave radio in the network. The point-to-point radio module comprises a baseband sub-module, RF module and beam narrowing module. The baseband module handles the baseband processing and, among other aspects, is responsible for baseband processing related to beamforming. RF module contains phased antenna array that works in conjunction with baseband module to generate point-to-point millimeter wave beam. A beam narrowing module is responsible for narrowing the beam by focusing most of the radiated signal energy in the desired direction and lowering the antenna side lobes to minimize the interference in a mesh network.

In one embodiment, the beam narrowing module can be a lens antenna integrated with an RF module. In another embodiment, the beam narrowing module can be a parabolic antenna integrated with an RF module. In yet another embodiment, the beam narrowing module could be a module other than a lens or parabolic antenna and rely on a different approach to narrow the beam originating from a phased array based RF module.

Figure 21:
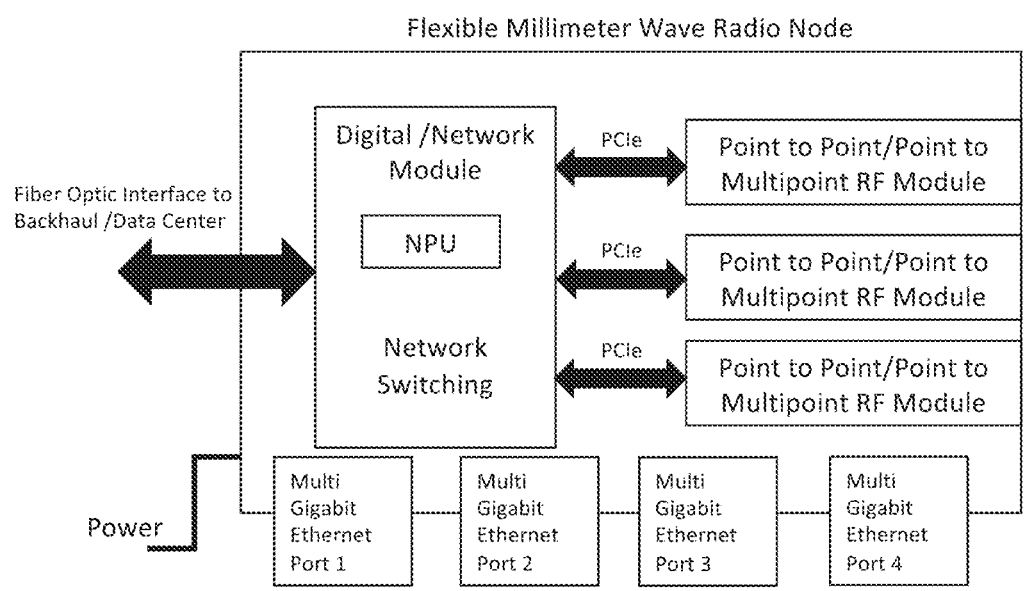
FIG. 21 depicts an example block diagram of a communication module, in accordance with various aspects of this disclosure.

Referring to FIG. 21, a logical block diagram of the communication module described above is shown. As explained earlier, a flexible millimeter wave radio node contains within an enclosure (typically outdoor) a digital/network module that has a network processing unit and is configured to provide network switch operations between the fiber optic backhaul interface and the point-to-point or point-to-multipoint radio modules either connected via PCI/PCIe interface or via multi gigabit ethernet ports. A flexible millimeter wave radio module also contains within the enclosure 3 point-to-point or point-to-multipoint radios. For providing mesh network deployment flexibility, a node can also be connected to external ptp/ptmp radios via ethernet ports. A node can be solar powered or can be powered via electric power outlet of the home where the node is installed. FIG. 21 also shows that this flexible millimeter wave radio node may only need a single network processing unit (NPU) that controls all the point-to-point or point-to-multipoint RF modules either connected via a PCI/PCIe interface or via a multi gigabit ethernet interface. Hence this example flexible millimeter wave radio node removes the need for using a dedicated NPU for each ptp/ptmp RF module.

Figure 22:
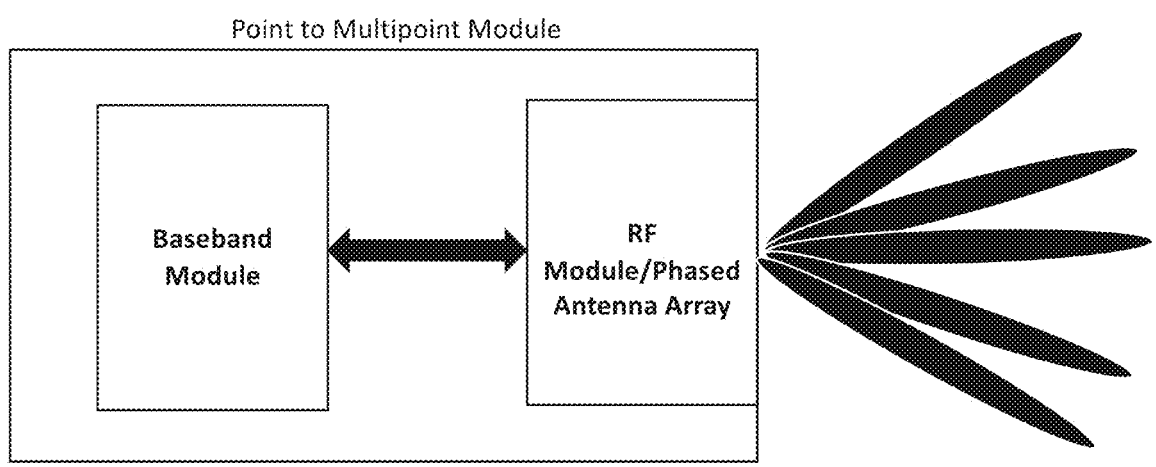
FIG. 22 depicts an example block diagram of a ptmp radio module of a communication node, in accordance with various aspects of this disclosure.

FIG. 22 shows a block diagram of a ptmp radio module of the communication node described above. As shown, this radio module contains a baseband module and a RF module that has the phase antenna array for providing beamforming capability.

Figure 23:
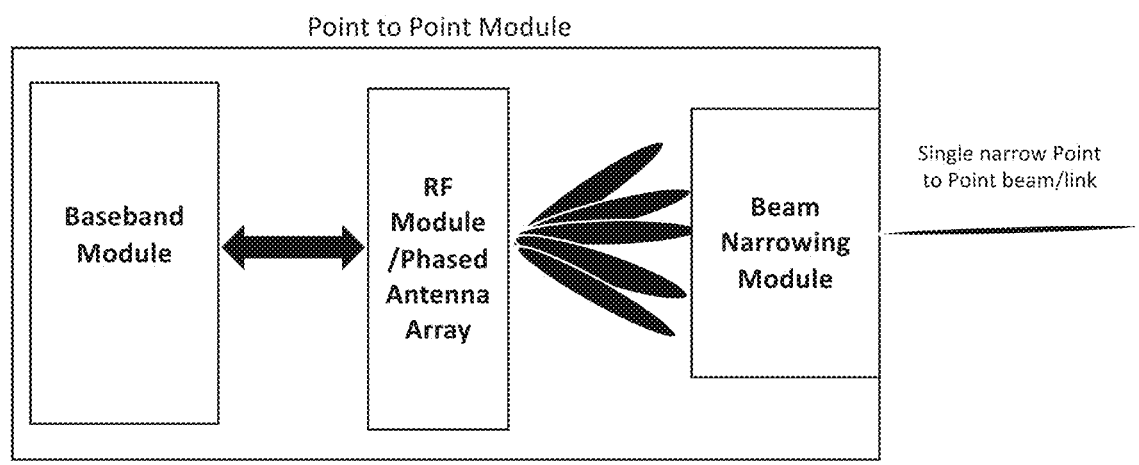
FIG. 23 depicts an example block diagram of a ptp radio module of a communication node, in accordance with various aspects of this disclosure.

FIG. 23 shows a block diagram of the ptp radio module of the communication node discussed above. This radio module contains a baseband module, an RF module that has the phase antenna array for providing beamforming capability, along with a beam narrowing module. The beam narrowing module, based on various techniques discussed earlier, narrows the beam generated by the phase antenna array of the RF module.

Figure 24:
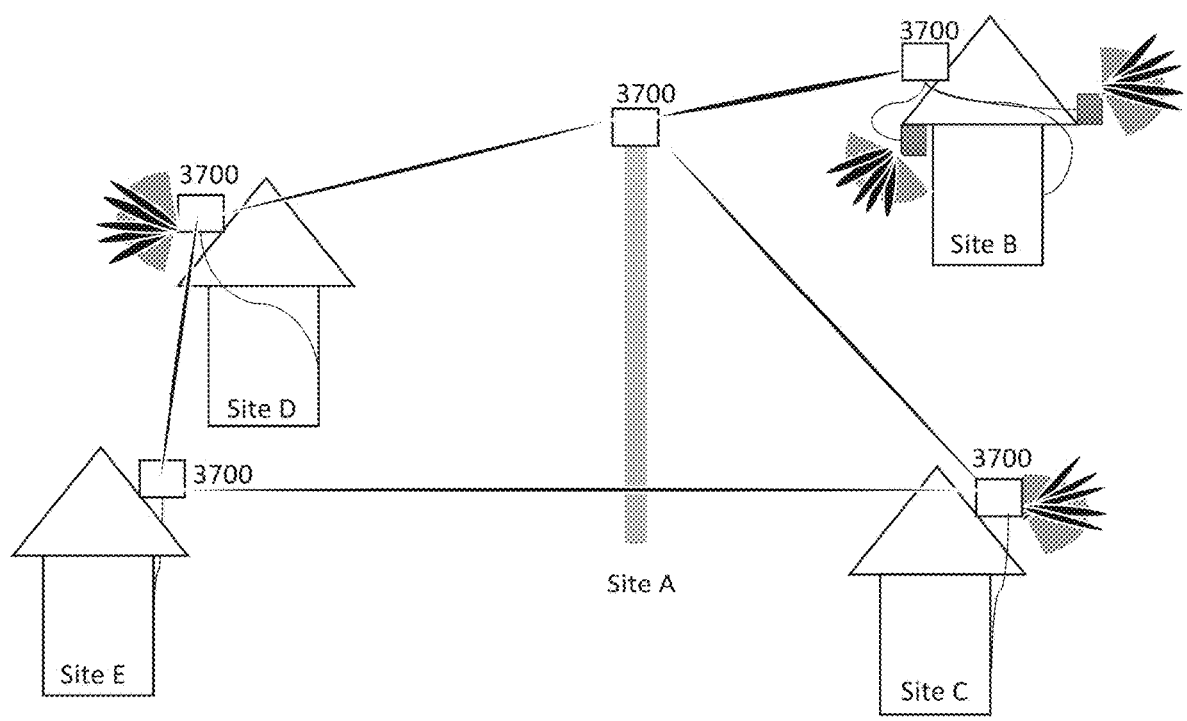
FIG. 24 depicts an example mesh network comprising a plurality of communication nodes, in accordance with various aspects of this disclosure.

Referring to FIG. 24, various different use cases of the communication node described above and explained in the context of FIGS. 21-23 is shown. FIG. 24 shows a mesh network comprising 5 communication nodes 3700. Communication nodes 3700 may each be a flexible millimeter wave communication node that has been discussed earlier.

At "Site A" of the mesh network, a communication node 3700 may be solar powered and mounted on the pole. This node 3700 at Site A may have 3 ptp links generated by 3 ptp radio modules integrated with the digital/network module. At "Site B," a communication node 3700 may be powered with an electric power outlet of the home and may have one ptp link via a single integrated ptp radio module and 2 ptmp links via two ptmp radio modules that are not integrated with a digital/network module but instead connected via ethernet interface to the communication node. Similarly, at "Site C," a communication node 3700 may be powered with an electric power outlet of the home and may have two ptp links via two integrated ptp radio module and one ptmp radio module integrated with a digital/network module. At "Site E," a communication node 3700 may be powered with an electric power outlet of the home and may have two ptp links via two integrated ptp radio module. Further, at "Site D," a communication node 3700 may be powered with an electric power outlet of the home and may have two ptp links via two integrated ptp radio module and one ptmp radio module integrated with the digital/network module.

It should be understood that FIG. 24 is described in such a manner for the sake of clarity and explanation and that the example mesh network described in FIG. 24 may take various other forms as well. For instance, the example mesh network may include more or less communication nodes, and a given communication node may take various other forms and may be mounted in various other manners and/or mounted on various other objects as well (e.g., mounted on a pedestal). Further, the example mesh network may have various different configurations of ptp or ptmp modules either integrated or connected via an ethernet interface and powered via various different power options.

Another important aspect of communication node 3700 is that the integrated radio modules can be pluggable. In other words, based on a specific use case, the number and types of radio modules integrated with a digital/network module via PCI/PCIe interface can easily be changed by plugging in the desired number and type of radio modules with full flexibility instead of have one specific configuration.

So far the modified version of communication node discussed above and also described in the context of FIGS. 21-24 assumes that the point-to-point or point-to-multipoint modules connected to a digital/network module with an NPU via a high speed interface (e.g., PCI/PCIe/Thunderbolt) are also located inside a same enclosure. It should be understood that the point-to-point or point-to-multipoint modules connected to a digital/network module via high speed interface can also be located outside the digital/network module with the NPU and inside an independent box/enclosure connected via an outdoor cable supporting the PCI/PCIe/Thunderbolt high speed communication protocol to the enclosure of the digital/network module.

Figure 25:
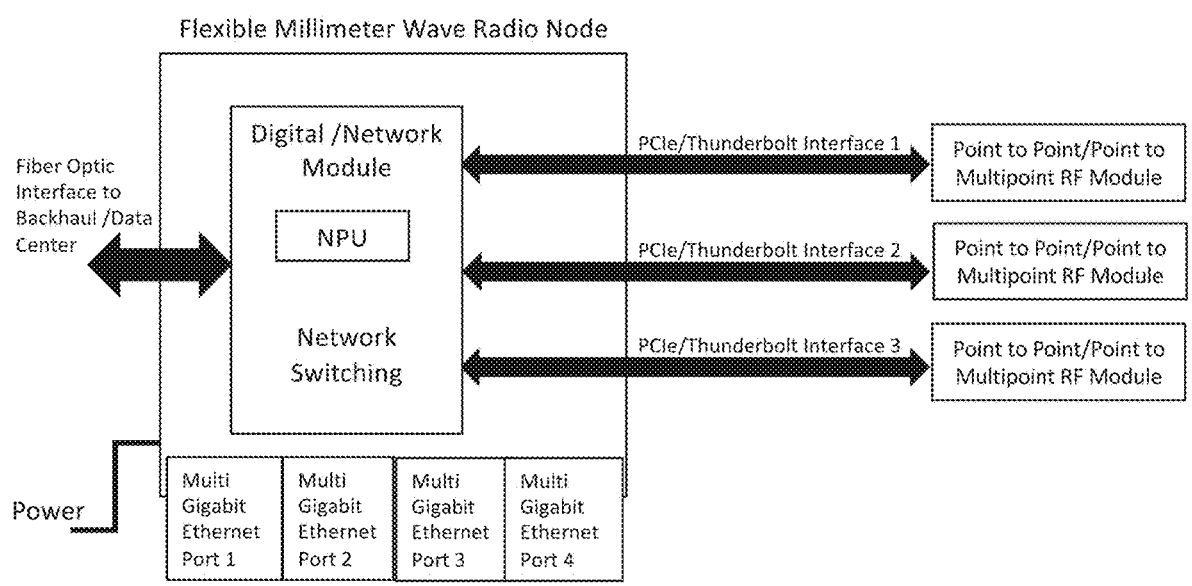
FIG. 25 depicts an example modified version of a flexible millimeter wave radio box, in accordance with various aspects of this disclosure.

As one example, FIG. 25 depicts a modified version of a flexible millimeter wave radio box, where the point-to-point or point-to-multipoint RF modules are located outside a digital/network module with NPU enclosure and inside separate independent box/enclosure and connected via an outdoor wired cable capable of supporting high speed communication interface (e.g., PCI/PCIe/Thunderbolt Interface). As shown, 3 point-to-point or point-to-multipoint modules are connected via PCIe/Thunderbolt interfaces to the digital/network module with the NPU using a compatible outdoor cable.

In general, it should be understood that N number of point-to-point or point-to-multipoint modules in separate independent enclosures can be connected via a PCIe/Thunderbolt compatible outdoor cable, where N is an integer greater than zero. It should also be understood that the length of the outdoor cable compatible with high speed communication protocol, such as PCIe/thunderbolt, depends on the maximum limit defined by the technology. In one embodiment, PCIe/thunderbolt cable can be up to 3 meters. In other embodiments, the length of the outdoor PCI/PCIe/thunderbolt compatible cable can be less than or greater than 3 meters.

Example embodiments of the disclosed innovations have been described above. At noted above, it should be understood that the figures are provided for the purpose of illustration and description only and that various components (e.g., modules) illustrated in the figures above can be added, removed, and/or rearranged into different configurations, or utilized as a basis for modifying and/or designing other configurations for carrying out the example operations disclosed herein. In this respect, those skilled in the art will understand that changes and modifications may be made to the embodiments described above without departing from the true scope and spirit of the present invention, which will be defined by the claims.

Further, to the extent that examples described herein involve operations performed or initiated by actors, such as humans, operators, users or other entities, this is for purposes of example and explanation only. Claims should not be construed as requiring action by such actors unless explicitly recited in claim language.

The invention claimed is:

1. A wireless communication node comprising:
 a first communication module having a first baseband unit and a first antenna unit that is embedded into the first baseband unit, wherein the first antenna unit is an ultra-wide band (UWB) antenna unit, and wherein the first communication module is configured to (i) establish, with a first other wireless communication node, a first beam-based, bidirectional communication link that operates on an ultra-wide band of frequencies and (ii) exchange UWB radio signals with the first other wireless communication node via the first beam-based, bidirectional communication link by using pulse modulation with extremely-short-duration pulses; and
 a second communication module having a second baseband unit and a second antenna unit, wherein the second communication module is configured to (i) establish, with at least a second other wireless communication node, a second beam-based, bidirectional communication link and (ii) exchange radio signals with the at least second other wireless communication node via the second beam-based, bidirectional communication link.

2. The wireless communication node of claim 1, wherein the extremely-short-duration pulses comprise pulses that each have a duration on the order of picoseconds.

3. The wireless communication node of claim 1, wherein the ultra-wide band of frequencies comprises a band of frequencies spanning a few hundred megahertz.

4. The wireless communication node of claim 1, wherein the ultra-wide band of frequencies comprises a band of frequencies spanning a few hundred gigahertz.

5. The wireless communication node of claim 1, wherein the UWB radio signals have a data rate of at least 100 gigabits per second.

6. The wireless communication node of claim 1, wherein the first beam-based, bidirectional communication link has a low power spectral density over the entire ultra-wide band of frequencies.

7. The wireless communication node of claim 1, wherein the UWB radio signals do not create interference with other radio signals being carried over other beam-based, bidirectional communication links operating on narrow bands of frequencies.

8. The wireless communication node of claim 1, further comprising:
 a parabolic antenna that interfaces with the first communication module.

9. The wireless communication node of claim 1, wherein the first baseband unit is configured to perform digital modulation and demodulation for the first communication module.

10. The wireless communication node of claim 1,
 wherein the second antenna unit is a UWB antenna unit that is embedded into the second baseband unit, and wherein the second communication module is configured to (i) establish, with the second other wireless communication node, a beam-based, bidirectional communication link that operates on an ultra-wide band of frequencies and (ii) exchange UWB radio signals with the second other wireless communication node via the beam-based, bidirectional communication link that operates on the ultra-wide band of frequencies by using pulse modulation with extremely-short-duration pulses.

11. The wireless communication node of claim 10, wherein the first communication module and the second communication module are housed within a single physical enclosure.

12. The wireless communication node of claim 10, wherein the first and second communication modules are part of an array of communication modules that are configured to perform a time-synchronized transmission for beamforming.

13. The wireless communication node of claim 1,
wherein the second baseband unit is configured to handle baseband processing for the second communication module, wherein the second communication module includes
a respective RF unit configured to define a frequency range of radio signals for the second communication module, and wherein
the second antenna unit is configured to (i) establish, with the second other wireless communication node, an extremely-narrow-beam-based, bidirectional communication link and (ii) exchange radio signals with the second other wireless communication node via the extremely-narrow-beam-based, bidirectional communication link.

14. The wireless communication node of claim 1, further comprising:
hardware and software that configures the wireless communication node to operate as an edge computing node of a distributed computing system.

15. The wireless communication node of claim 14, wherein the hardware that configures the wireless communication node to operate as an edge computing node of a distributed computing system comprises one or more processors and data storage, and wherein the data storage contains one or both of (i) digital contents that is local to the wireless communication node or (ii) digital contents belonging to other wireless communication nodes.

16. The wireless communication node of claim 1, wherein the first communication module is further configured to employ beam steering to disestablish the first beam-based, bidirectional communication link with the first other wireless communication node and then establish, with a third other wireless communication node, a third beam-based, bidirectional communication link that operates on an ultra-wide band of frequencies.

17. The wireless communication node of claim 1, wherein the second baseband unit is configured to handle baseband processing for the second communication module, wherein the second communication module further includes a respective RF unit configured to define a frequency range of radio signals for the second communication module, and wherein the second antenna unit comprises a phased antenna array that is configured to (i) establish, with a set of one or more other wireless communication nodes that includes at least the second other communication node, a beam-based, bidirectional point-to-multipoint communication link and (ii) exchange radio signals with the set of one or more other wireless communication nodes via the beam-based, bidirectional point-to-multipoint communication link.

18. A wireless communication system comprising:
a first wireless communication node comprising at least first and second communication modules, wherein the first communication module includes a first baseband unit and a first antenna unit that is embedded into the first baseband unit, wherein the first antenna unit is a first ultra-wide band (UWB) antenna unit, and wherein the second communication module includes a second baseband unit and a second antenna unit;
a second wireless communication node comprising at least a third communication module that includes a third baseband unit and a second UWB antenna unit that is embedded into the third baseband unit; and
a third wireless communication node comprising at least a fourth communication module;
wherein a first beam-based, bidirectional communication link that operates on an ultra-wide band of frequencies is established between the first communication module of the first wireless communication node and the third communication module of the second wireless communication node;
wherein the first communication module of the first wireless communication node and the third communication module of the second wireless communication node are configured to exchange UWB radio signals with one another via the first beam-based, bidirectional communication link by using pulse modulation with extremely-short-duration pulses;
wherein a second beam-based, bidirectional communication link is established between the second communication module of the first wireless communication node and the fourth communication module of the third wireless communication node; and
wherein the second communication module of the first wireless communication node and the fourth communication module of the third wireless communication node are configured to exchange radio signals with one another via the second beam-based, bidirectional communication link.

19. The wireless communication system of claim 18, wherein the extremely-short-duration pulses comprise pulses that each have a duration on the order of picoseconds.

20. The wireless communication system of claim 18, wherein the ultra-wide band of frequencies comprises a band of frequencies spanning at least a few hundred megahertz.

21. The wireless communication system of claim 18, wherein the ultra-wide band of frequencies comprises a band of frequencies spanning at least a few hundred gigahertz.

22. The wireless communication system of claim 18, wherein the
second communication module further includes a third UWB antenna unit that is embedded into the second baseband unit, and wherein the second communication module is configured to (i) establish, with the third wireless communication node, a beam-based, bidirectional communication link that operates on an ultra-wide band of frequencies and (ii) exchange UWB radio signals with the third wireless communication node via the beam-based, bidirectional communication link that operates on the ultra-wide band of frequencies by using pulse modulation with extremely-short-duration pulses.

23. The wireless communication system of claim 18, wherein the second baseband unit is configured to handle baseband processing for the second communication module, wherein the second communication module further includes a respective RF unit configured to define a frequency range of radio signals for the second communication module, and wherein the second antenna unit is configured to (i) establish, with the third wireless communication node, an extremely-narrow-beam-based, bidirectional communication link and (ii) exchange radio signals with the third wireless communication node via the extremely-narrow-beam-based, bidirectional communication link.

24. The wireless communication system of claim 18, wherein the second baseband unit is configured to handle baseband processing for the second communication module, wherein the second communication module further includes a respective RF unit configured to define a frequency range of radio signals for the second communication module, and wherein the second antenna unit comprises a phased antenna array that is configured to (i) establish, with a set of one or more other wireless communication nodes that includes at least the third wireless communication node, a beam-based, bidirectional point-to-multipoint communication link and (ii) exchange radio signals with the set of one or more other wireless communication nodes via the beam-based, bidirectional point-to-multipoint communication link.

* * * * *